(12) United States Patent
Fukui

(10) Patent No.: US 7,499,764 B2
(45) Date of Patent: Mar. 3, 2009

(54) CONSTRAINT-BASED SOLUTION METHOD, CONSTRAINT-BASED SOLVER AND CONSTRAINT-BASED SOLUTION SYSTEM

(75) Inventor: Toshio Fukui, Tokyo (JP)

(73) Assignee: Metalogic, Inc., Tokyo (JP)

( * ) Notice: Subject to any disclaimer, the term of this patent is extended or adjusted under 35 U.S.C. 154(b) by 268 days.

(21) Appl. No.: 11/447,765

(22) Filed: Jun. 6, 2006

(65) Prior Publication Data

US 2007/0010901 A1 Jan. 11, 2007

Related U.S. Application Data

(63) Continuation-in-part of application No. PCT/JP2005/000752, filed on Jan. 21, 2005.

(30) Foreign Application Priority Data

Jan. 21, 2004 (JP) ............................... 2004-013629

(51) Int. Cl.
  G05B 13/02 (2006.01)
  G05B 11/01 (2006.01)
  G05B 19/18 (2006.01)
  G05B 19/418 (2006.01)
  G06E 1/00 (2006.01)

(52) U.S. Cl. ................................ 700/33; 700/2; 700/14; 700/248; 706/14

(58) Field of Classification Search ................... 700/2, 700/248, 14, 33; 706/14
See application file for complete search history.

(56) References Cited

U.S. PATENT DOCUMENTS 3,873,816 A * 3/1975 Takeyama et al. ........... 318/561
3,878,982 A * 4/1975 Hoffman ...................... 700/34
5,311,421 A * 5/1994 Nomura et al. ............... 700/37
6,047,219 A * 4/2000 Eidson ........................... 700/2
6,865,562 B2 * 3/2005 Fromherz et al. ............. 706/14

FOREIGN PATENT DOCUMENTS

JP 5-165900 A 7/1993

(Continued)

OTHER PUBLICATIONS

Christiansen et al.,"Open Theories and Abduction for Context and Acommodation" 1999 1-2 abstract.*

(Continued)

*Primary Examiner*—Albert DeCady
*Assistant Examiner*—Thomas H Stevens
(74) *Attorney, Agent, or Firm*—Knobbe Martens Olson & Bear, LLP

(57) ABSTRACT

The purpose is to solve target problems in short calculation time certainly without describing algorithms that are data procedures on computers. As the solution method, because it is configured so that, when the initial values or variation values, which are used for constraint conditions with regard to target problems and the relevant constraint conditions, are set through Variable Value Setting 2, then Constraint Condition Extraction 3 extracts constraint conditions that are related to those variables, then Constraint Condition Calculation 4 searches for the solutions for each constraint condition one by one, and Variable Value Resetting repeats searching for the solutions for each constraint condition setting these searched solutions as new variables, so the course of solution searching becomes clear, and it becomes possible to surely reach the final solution and dramatically speed up computing, because each markedly simplified constraint condition has only to be solved.

5 Claims, 20 Drawing Sheets

FOREIGN PATENT DOCUMENTS

| JP | 7-175844 A | 7/1995 |
| JP | 2001-243056 A | 9/2001 |
| JP | 2002-196927 A | 7/2002 |
| JP | 2003-149326 A | 5/2003 |

OTHER PUBLICATIONS

Fukui et al., "Phenotypic Genetic Algorithm for Partitioning Problem" 1997 IEEE p. 1-2 abstract.*

International Search Report, Application No. PCT/JP2005/000752, Filed Jan. 21, 2005 (original and translated copy, 8 pages total).

Written Opinion of the International Searching Authority, Application No. PCT/JP2005/000752, Filed Jan. 21, 2005 (original and translated copy, 8 pages total).

International Preliminary Report on Patentability, Application No. PCT/JP2005/000752, Filed Jan. 21, 2005 (original and translated copy, 11 pages total).

* cited by examiner

Fig.3
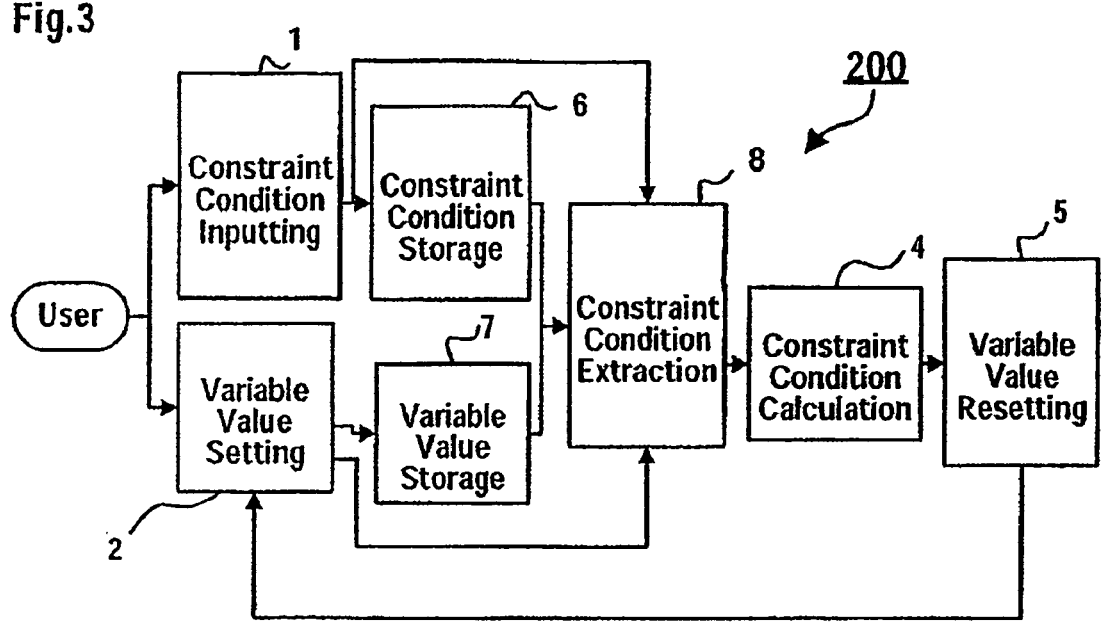
Fig.4
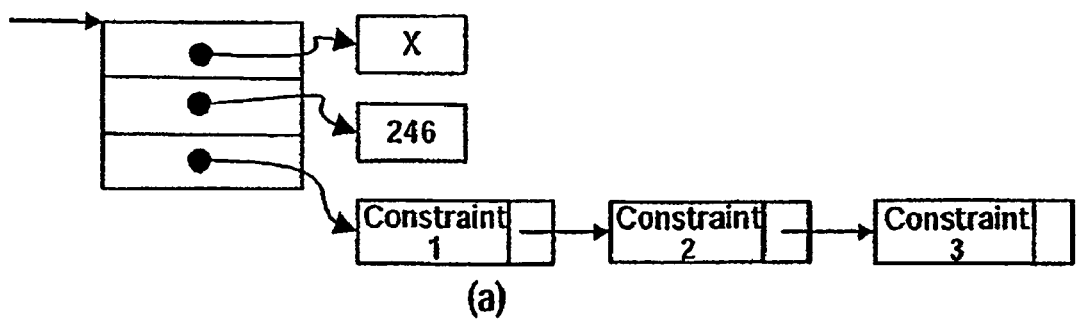
(a)
$X = Y + Z$
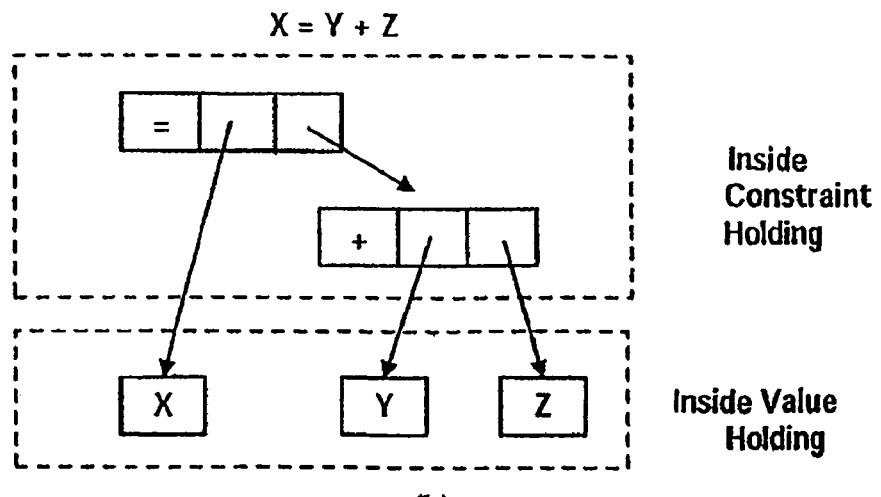
(b)

Fig.6
subtotal[i] = price[i] * quantity[i]
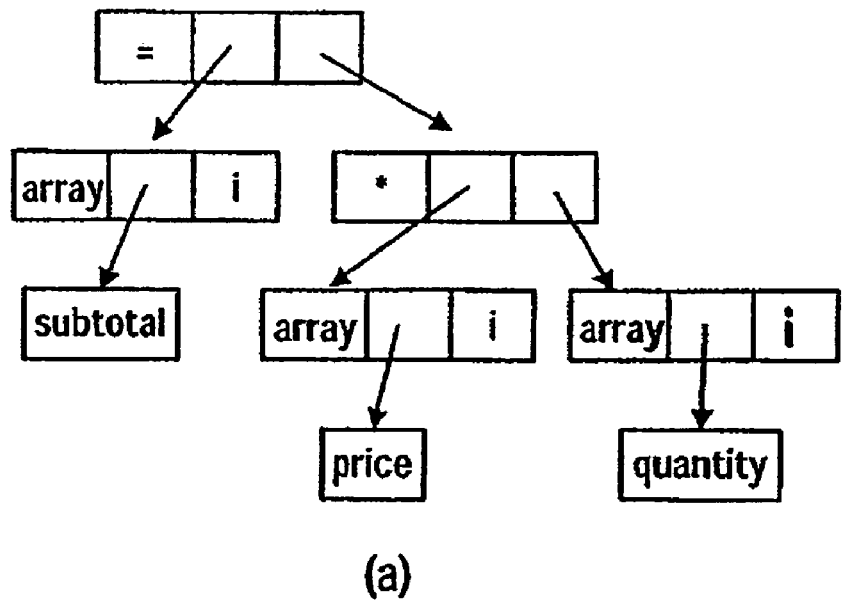
(a)
total = totalarray( 1, totalitems, subtotal )
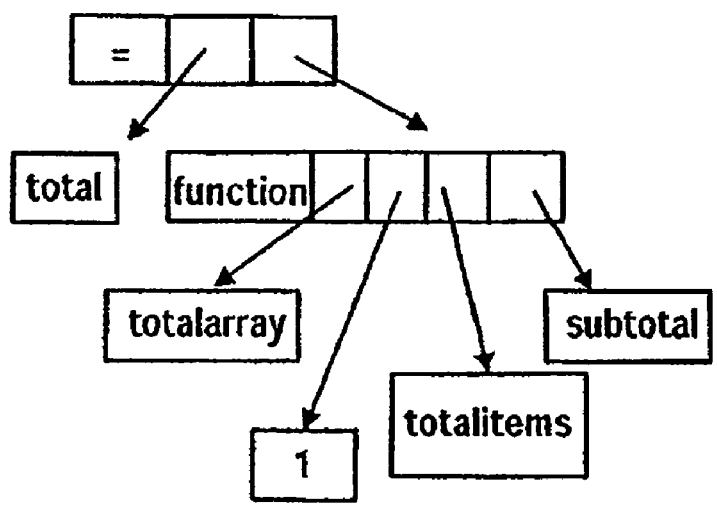
(b)

Fig.12(a)
```
struct {
    date wdate;
    string name;
    string message;
} bbsdata[];

int start_count = 0;
int list_count = 0;

struct {
    string wdate;
    string name;
    string html;
} output_block[];

string output_html;

(Above is the definition at Value Holding and the stored data.)

void bbs_additem( string input_data, string input_name, string input_message )
{
    int t = vsize(bbsdata);

bbsdata[t].date    = input_date[0..3] & "/" &
                         input_date[5..6] & "/" & input_date[8..9];
    bbsdata[t].name    = input_name;
    bbsdata[t].message = input_message;
    return;
}

(Above is the function definition to be stored at Function Holding.)
```

Fig.12(b)

```
{ vsize(output_block) = list_count; };

{ output_block[$i].wdate[0..3] = bbsdata[$i+start_count].wdate[0..3];
  output_block[$i].wdate[4..5] = "year";
  output_block[$i].wdate[6..7] = bbsdata[$i+start_count].wdate[5..6];
  output_block[$i].wdate[8..9] = "month";
  output_block[$i].wdate[10..11] = bbsdata[$i+start_count].wdate[8..9];
  output_block[$i].wdate[12..13] = "day"; };
{ output_block[$i].name = strtrunc( bbsdata[$i+start_count].name, 20 ); };
{ output_block[$i].html = "article number " & inttostring( $i+start_count ) &
    " date " & output_block[$i].wdate & "<BR> ¥n" &
    " name " & output_block[$i].name & "<BR> ¥n" &
    " message <BR> ¥n" & bbsdata[$i+start_count].message & "<BR><BR> ¥n"; };
{ output_html = "<HTML><BODY> ¥n" &
    " & inttostring( start_count ) & " " &
    inttostring( list_count ) & "<BR><BR> ¥n" &
    output_block[*].output_html & "</BODY></HTML>"; };
```

(Above are the constraints to be stored at Constraint Holding.)

Fig.21

The example of operators to select the range of array elements

| | |
|---|---|
| [n..m] | select the elements of n th ~ m th in the array |
| [*] | select all elements in the array |
| [$] | the end of array elements |
| [#] | the end of extendable array elements + 1 |
| [!<form>] | select the elements other than designated values in the array |
| [<form> && <form>] | and condition of designated elements |
| [<form> \|\| <form>] | or condition of designated elements |
| [.=y] | search for and select the element when the element in the array is y |
| [x=y] | search for the elements that the value of member x of structure array is y from the beginning and select them |
| [x(n)=y] | search for the elements that the value of member x of structure array is y from the beginning and select the n th |
| [x(-n)=y] | search for the elements that the value of member x of structure array is y from the end and select the n th |
| [x(*)=y] | search for the elements that the value of member x of structure array is y and select all |
| ["regular expression "] | search for the elements of the array of character strings with the regular expression and select them |
| [x=" regular expression "] | search for the elements of character strings of member x of structure array with the regular expression and select the elements of array | the example for the operation of array

| | |
|---|---|
| v[5] | express the 5 th element in array v |
| v[!n] | express the array that has the elements other than the n th element in array v |
| v[0..3 \|\| 5..$] | express the array that has the elements other than the 4th element in array v |
| s["[ab]ab*" \|\| "[cd]cd*"] | express the contents that regular expression in the character string s matches with |
| v[append(0,1,2,5..$)] | Although it expresses the total combination of the elements (0,1,2,5...$) in the array v, the function append() will be used as a method of computing. Function append has the same meaning as the one that is defined in programming language LISP. |

* The operators above are just examples.
* The operators above can be mixed freely in the combination with general functions.

Fig. 24 (a)-(h)

(a)
```
fukui@lightwing:~$
```

(b)
```
fukui@lightwing:~$ ripple
```

(c)
```
fukui@lightwing:~$ ripple      241
RIPPLE-S Ver.x.xx.x
% { subtotal [i]=price[i]*quantity[i]; };
t
% { total = totalarray( subtotal ); };
t
                                    242
```

(d)
```
     :
% price[1] = 100 ;    243
100;
% price[2] = 200 ;    244
200;
```

(e)
```
     :
% load("prog.rip") ;   245
t
% total ;    246
1550;
```

(f)
```
     :
% price[2] = 250 ;   247
250
% total ;   248
1700
% price[5] = 310 ;   249
310
% quantity[5] = 3 ;   250
3
```

(g)
```
% total ;    :
2630      251
```

(h)
```
     :
% quit() ;    252
fukui@lightwing:~$
```

CONSTRAINT-BASED SOLUTION METHOD, CONSTRAINT-BASED SOLVER AND CONSTRAINT-BASED SOLUTION SYSTEM

CROSS-REFERENCE TO RELATED APPLICATIONS

This application is a continuation-in-part of, and claims priority benefit under 35 U.S.C. § 120 to International Application PCT/JP2005/000752, filed Jan. 21, 2005, which claims priority to Japanese Patent Application No. 2004-013629, filed Jan. 21, 2004 and the entire disclosures of which are both incorporated herein by reference in their entirety. The International Application was not published under PCT Article 21(2) in English.

BACKGROUND OF THE INVENTION

1. Field of the Invention

This invention is relevant to the effective solution concerning the problems consisting of any constraint condition, and especially, the Constraint-based Solution Method, Constraint-based Solver, and Constraint-based Solution System, which becomes practicable only by setting the constraint conditions, of which the procedure for constraint propagation is considered, and the variable values.

2. Description of the Related Art

The procedural programming method, in which the user describes the procedures of data (algorithm) successively after the procedural declaration of data structures using programming languages such as, for example, C language and JAVA, is the mainstream of current common programming methods for various application programs. The procedures of data by this procedural programming are, in principle, correspondent with the procedures that computers actually execute, except that optimization is performed by the optimizing functions of compiling programs. Therefore, the procedural programming method is a solution method, which can flexibly respond to various problems through describing the details of computer (CPU) behaviors.

As an alternative method for the above-mentioned procedural programming method, which describes CPU behaviors, there is the declarative programming method. This is the method to leave everything to the CPU as for actual data procedures after the constraint conditions which are corresponding to the target problems are defined by the user, and it has been conventionally used as a convenient problem solution method for certain problem areas. (e.g. Patent Document 1 or 2)

The aforementioned declarative programming has characteristics that the user has only to wait for solution to be output just describing constraint conditions, whereas they cannot interfere with the order in which the CPU executes data processing. Among the programming methods, which are broadly divided into two aforementioned groups, the procedural programming method is mainly used in the current computing environment.

If program development is performed in this procedural programming method, as soon as the user defines the data structure, algorithm, which should be described with the data structure, is usually determined in conjunction with that. Furthermore, such algorithm can be expressed in the same procedure and patterned for the similar target problems.

Consequently, it has been a conventional problem that program development becomes inefficient in that same kind of programming works are overlapped in each application. To cope with this problem, recently, programming works have been promoted to be highly efficient through actively introducing the partialization of software by the creation of libraries of programming parts which are commonly used and software development based on object-orientation, thus focusing on the parts which existing programs do not have.

SUMMARY OF THE INVENTION

Problems to Be Resolved by the Invention

However, realistically, the number of software parts which are developed into libraries is gigantic, and furthermore, it has been increasing every year. Considering the fact that each programmer made not a few selection mistakes when he or she extracted the most appropriate parts for the target problem from this gigantic parts group, and that there was the danger of having to redo the development work by choosing them again, there was a problem that there were many cases in which each programmer performed coding work from scratch without utilizing software parts. Besides, because object-oriented software development required a certain skill, not every programmer could do object-oriented programming work, and as a whole, there was a problem that work efficiency wasn't enhanced so much. As just described, the present condition is that the excluded aspect that individual skills are relied on and the inefficient aspect haven't been solved yet.

On the other hand, as mentioned previously, at least the description of constraint conditions and the data used for the relevant constraint conditions are necessary in the declarative programming method, and the number of the constraint conditions and data becomes huge if it is applied to actual problems. An actual problem here is, for example, a combinatorial optimization problem that satisfies simultaneous equations of $f_k(X_1, X_2, \ldots, X_n) \leq b_k$ (k=1, 2, ..., m) and that makes evaluation function $f_0(X_1, X_2, \ldots, X_n)$ minimum value. That is, as shown in FIG. 17, the computer (the constraint solver in FIG. 17) searches in a lump for the data which simultaneously satisfy all constraint conditions if the constraint conditions expressed with m pieces of simultaneous equations and evaluation function $f_0$ are given to the computer.

This combinatorial optimization problem exponentially increases the possibilities of combination in the solution space as the number of variable X and simultaneous equations increase, so procedures on the computer become complex and gigantic. In addition, especially when the function $f_k$ is non-linear, there are some cases in which dispersed numerous solution spaces exist, and one device or another to search for the solution efficiently without searching in solution spaces that have no solution and falling into infinity loop is necessary. By the way, along with combinatorial optimization problems, there are also similar problems in combination sufficiency problems, integer programming, and so on.

Moreover, when it becomes necessary to modify the parts of the condition equations of constraint conditions or the input data, there were problems of great inefficiency as well as the waste of resources, because the similar constraint condition problems that have already been calculated should be re-calculated from scratch.

Consequently, in consideration of the aforementioned problems, this invention is intended to surely solve target problems in a short calculation time, without describing algorithms which are data processing procedures on the computer.

Solving the Problem

The Constraint-based Solution Method in this invention includes—Constraint Condition Inputting Processes to input constraint conditions, of which processing procedures for constraint propagation regarding the target problem are considered by users; Variable Value Setting Processes to set the default and variation values used for the constraint conditions which are input by the above-mentioned Constraint Condition Inputting Processes; Constraint Condition Extraction Processes to extract the constraint conditions in relation to the values which are set by the above-mentioned Variable Value Setting Processes from the constraint conditions which are input by the above-mentioned Constraint Condition Inputting Processes; Constraint Condition Calculation Processes to calculate the solutions of the relevant constraint conditions, assigning the default or variation values to the above-mentioned variables, in conformity to the procedure orders of the constraint propagation which are considered by the above-mentioned users, concerning all of the constraint conditions that are extracted by the above-mentioned Constraint Condition Extraction Processes; and Variable Value Resetting Processes to set the solutions calculated by the above-mentioned Constraint Condition Calculation Processes as the new variation values for the above-mentioned Variable Value Setting Processes; and is characterized by the fact that above-mentioned Variable Value Resetting Processes repeat the execution of the above-mentioned Constraint Condition Extraction Processes and above-mentioned Constraint Condition Calculation Processes as long as new variation values which are reset exist.

In the Constraint-based Solution Method of the present invention which includes—the Constraint Condition Inputting Processes to input constraint conditions, the Variable Value Setting Processes to set the variation values used for the constraint conditions which are input by the above-mentioned Constraint Inputting Processes; the Constraint Condition Extraction Processes to extract the constraint conditions in relation to the values which are set by the above-mentioned Variable Value Setting Processes from the constraint conditions which are input by the above-mentioned Constraint Condition Inputting Processes; and the constraint solution methods which include the Constraint Condition Calculation Processes which calculate the solutions of the constraint conditions extracted by the above-mentioned Constraint Condition Extraction Processes; above-mentioned constraints are characterized and comprised of at least either of the facts that the number of current array elements is included, numerous values are given to the above-mentioned variables, searching by the element values of structure arrays is included, and that letter strings are converted into numbers by the default rule.

The Constraint-based Solver in this invention includes—Constraint Condition Inputting to input the constraint conditions, of which the processing procedures for constraint propagation regarding the target problem are considered by users; Variable Value Setting to set the default and variation values used for the constraint conditions which are input by the above-mentioned Constraint Condition Inputting; Constraint Condition Extraction to extract the constraint conditions in relation to the values which are set by the above-mentioned Variable Value Setting from the constraint conditions which are input by the above-mentioned Constraint Condition Inputting; Constraint Condition Calculation to calculate the solutions of the relevant constraint conditions, assigning the default or variation values to the above-mentioned variables, in conformity to the procedure orders of the constraint propagation which are considered by the above-mentioned user, concerning all of the constraint conditions that are extracted by the above-mentioned Constraint Condition Extraction; and Variable Value Resetting to set the solutions calculated by the above-mentioned Constraint Condition Calculation as the new variation values for the above-mentioned Variable Value Setting; and is characterized by the fact that above-mentioned Variable Value Resetting repeat the execution of the above-mentioned Constraint Condition Extraction and above-mentioned Constraint Condition Calculation as long as new variation values which are reset exist.

In the Constraint-based Solver of this invention which include—Constraint Condition Inputting to input constraint conditions, Variable Value Setting to set the values of variables used for the constraint conditions which are input by the above-mentioned Constraint Condition Inputting; Constraint Condition Extraction to extract the constraint conditions in relation to the values which are set by the above-mentioned Variable Value Setting from the constraint conditions which are input by the above-mentioned Constraint Condition Inputting; and the constraint solution methods which include Constraint Condition Calculation which calculate the solutions of the constraint conditions extracted by the above-mentioned Constraint Condition Extraction; above-mentioned constraint conditions are characterized and comprised of at least either of the facts that the number of current array elements is included, numerous values are given to the above-mentioned variables, searching by the element values of structure arrays is included, and that letter strings are converted into numbers by the default rule.

The Constraint-based Solution System of this invention is characterized in that numerous hardware are connected to each other to enable communication, and at least one of the above-mentioned hardware has either function of Constraint-based Solver that was described above.

Advantageous Effect of the Invention

According to this invention, it is comprised so that the procedures, in which solutions that satisfy each constraint condition are found after extracting constraint conditions which are related to the relevant values of variables and the solutions of each above-mentioned constraint condition are found through assigning the given solutions as the new values of variables (variation values), are repeated when constraint conditions of which the procedure for constraint propagation is considered and the values of variables (default values) which are used for constraint conditions are input, thus enabling to find solutions for each single constraint condition without having any AND relationship with other constraint conditions, and to find final solutions while performing rapid calculation procedures.

BRIEF DESCRIPTION OF THE DRAWINGS

Simple Explanation of Drawings

FIG. 3 This is the overall configuration drawing of the Constraint-based Solver in the second embodiment of the present invention.

FIG. 4(*a*)-(*b*) This is the drawing that shows the mode example that Constraint Condition Storage of the Constraint-based Solver in the first embodiment stores constraint conditions in the memory areas of computers.

FIG. 6(a)-(b) This is the drawing that shows one example of the storage mode of constraint conditions with regard to accounting calculation problems.

FIG. 12(a)-(b) This is the drawing that, with regard to the system that is shown in FIG. 11, data stored in Function Definition Holding and Constraint Condition Storage and one example of constraint conditions are shown.

FIG. 24(a)-(h) This is the drawing that shows the screen examples that the user inputs the constraint conditions and values and output the calculation results and such.

EXPLANATION OF SYMBOLS

1 Constraint Input
2 Variable Value Setting
3 Constraint Extraction 3
4 Constraint Solution Calculation
5 Variable Resetting
6 Constraint Condition Storage
7 Variable Value Storage
8 Constraint Extraction 3
9 Function Definition Holding
10 Function Definition Execution
11 Databases
12 System Resources
100 Constraint-based Solver
200 Constraint-based Solver
300 Constraint-based Solver
400 Constraint-based Solver

DETAILED DESCRIPTION OF THE PREFERRED EMBODIMENT

Best Mode for Carrying Out the Invention

Hereinafter, preferred embodiments of the present invention will be described in detail with referent to the drawings.

Figure 18:
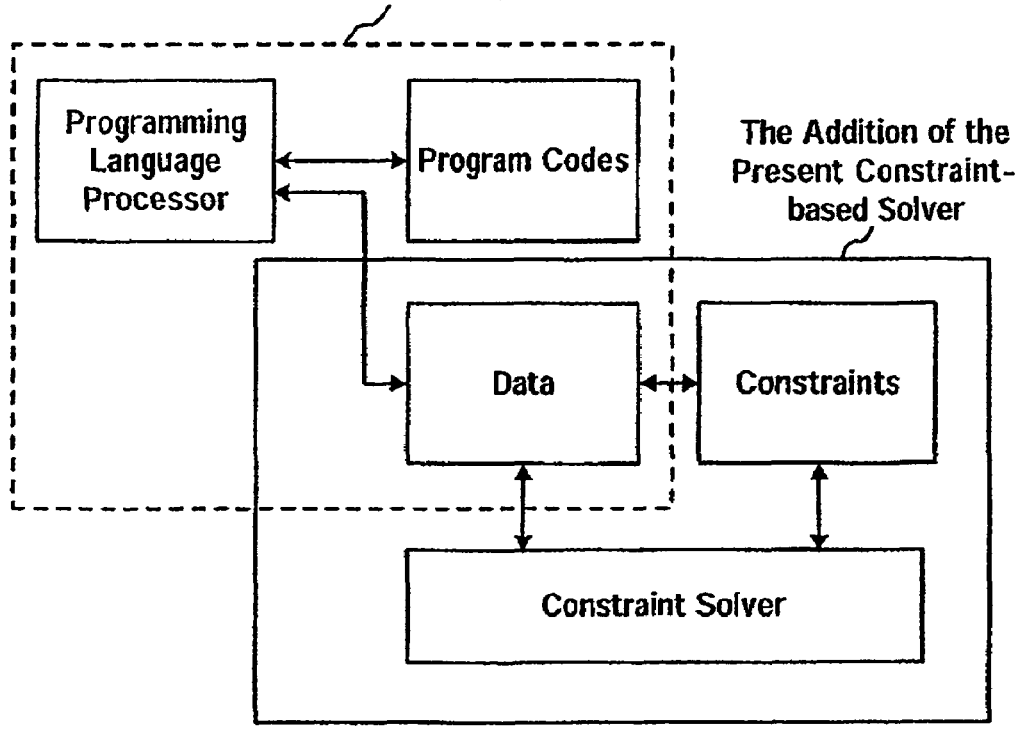
FIG. 18 This is the conceptual drawing that shows the positioning between the conventional programming language environment and the Constraint-based Solver of the present invention, which searches for the solutions of constraint conditions.

FIG. 18 is a conceptual figure that shows the positioning between the conventional programming language environment and the Constraint-based Solver of the present invention, which searches for the solutions of constraint conditions. As shown in FIG. 18, the conventional programming language environment has a programming language processor, program codes, and data, and it has the mode that programming language processor controls program codes and data. The present invention has the configuration so that constraints (constraint conditions) and constraint solvers are provided along with the data of the conventional programming language environment and that they are connected to exchange information with each other.

Figure 19:
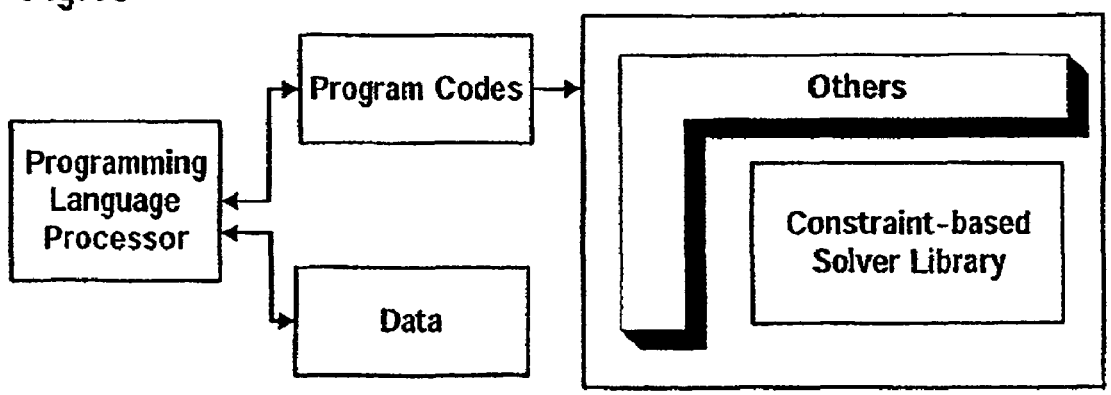
FIG. 19 This is the conceptual drawing that shows the configuration of the conventional programming language environment.

In addition, FIG. 19 also shows the conventional programming language environment, but it is the configuration figure in which the aforementioned conventional Constraint-based Solver is composed in the form of library.

The First Embodiment

At first, the basic configuration and the basic operation of the Constraint-based Solver in the first embodiment of the present invention will be explained.

Basic Configuration of the Constraint-based Solver 100

Figure 1:
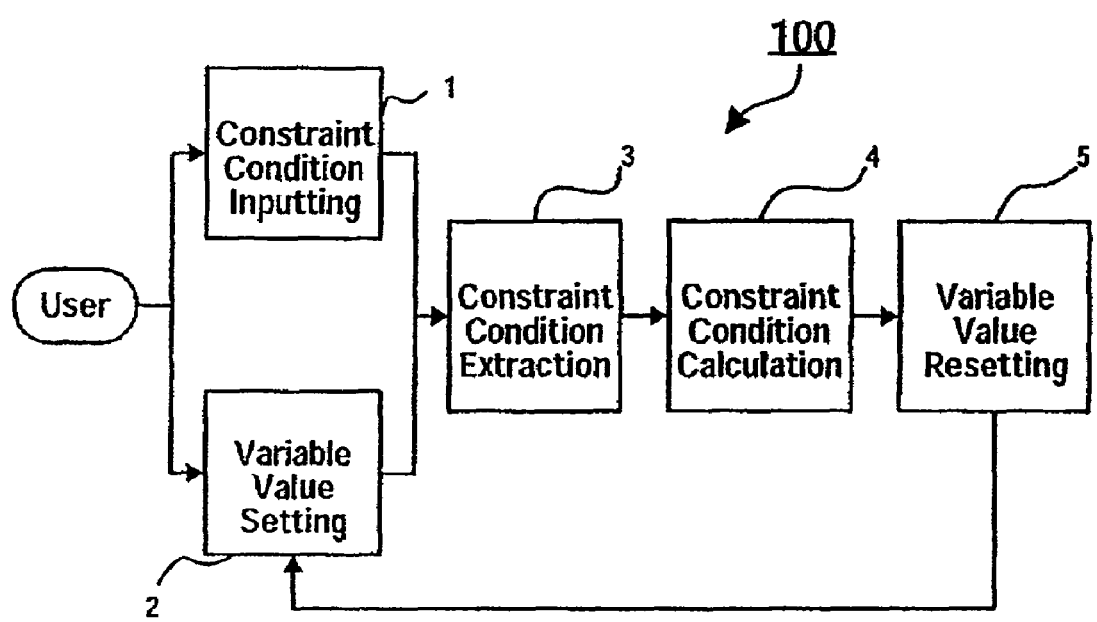
FIG. 1 This is the overall configuration drawing which shows the basic constituent elements of the Constraint-based Solver in the first embodiment of the present invention.

FIG. 1 is the overall configuration figure indicating the basic constituent elements of the Constraint-based Solver 100. As shown in FIG. 1, the Constraint-based Solver 100 includes Constraint Condition Inputting 1, Variable Value Setting 2, Constraint Condition Extraction 3, Constraint Condition Calculation 4, and Variable Value Resetting 5.

Constraint Condition Inputting 1 is to input the constraint conditions that the user decided to use through imagining the procedures of constraint propagation by the computer (CPU). Variable Value Setting 2 is to set up specific initial values that the user assigns for each variable that comprises the constraint constraints, which were input with Constraint Condition Inputting 1. Moreover, as described in detail later, it also sets up the values other than initial values (hereinafter, referred to as variation values) to each variable. Besides, Constraint Condition Inputting 1 and Variable Value Setting 2 are so to speak User Interfaces for data input and have no limit in particular, and include various tools to make it easier to input and can be equipped with display (monitor) screens in which values which are input by the user can be confirmed. In addition, a configuration including output-indicating functionality (not shown in the figure) that submit the values calculated by the Constraint-based Solver 100 to the user can be permitted. This output-indicating functionality also can be equipped with display (monitor) screens on which output values can be confirmed. Furthermore, it can be input-output functionality that can input and output data by making it one of the Constraint Condition Inputting 1 (including Variable Value Setting 2) and output-indicating functionality.

Constraint Condition Extraction 3 extracts constraint conditions bearing each variable to which an initial value or variation value as a constituent element is set from the constraint conditions that are input. In this embodiment, Constraint Condition Extraction 3 is configured so that relevant constraint conditions are extracted in a mass, but it is no problem to extract one at a time, so that the solution of a constraint condition with Constraint Condition Calculation 4 to be hereinafter described and the extraction of the next constraint condition are repeated in order.

Although Constraint Condition Calculation 4 solves each constraint condition to which initial values or variation values are assigned, as the characteristics of the present invention, it is not solved in a lot as a so-called simultaneous solution that satisfies all constraint conditions, but each constraint condition is targeted to be solved one by one. Consequently, if a value of a certain variable is set or changed, the first solutions of constraint conditions are given in order, according to the predetermined order sequentially. The above-mentioned predetermined order here is the order that is indicated in the constraint conditions that the user (programmer) has input in consideration of the procedures for constraint propagation.

Here are examples of constraint conditions.

(A) Example 1 of Constraint Conditions

The following accounting calculation problem can be cited as a typical example used as the explanation to readily understand the declarative programming method. When each price and quantity of four items is set as (1)$100, 2 pieces, (2)$200, 3 pieces, (3)$300, 2 pieces, (4)$50, 3 pieces, if the constraint conditions in the present invention are expressed with the array variables of prices, quantities, and subtotals, they are expressed as follows;

$$\text{price}[1]=100, \text{price}[2]=200, \text{price}[3]=300, \text{price}[4]=50 \quad \text{(Formula 1)}$$

$$\text{quantity}[1]=2, \text{quantity}[2]=3, \text{quantity}[3]=2, \text{quantity}[4]=3 \quad \text{(Formula 2)}$$

$$\text{subtotal}[i]=\text{price}[i]*\text{quantity}[i] (i=1 \text{ to } 4) \quad \text{(Formula 3)}$$

$$\text{total}=\Sigma \text{subtotal}[i] (i=1 \text{ to } 4) \quad \text{(Formula 4)}$$

(Formula 1) and (Formula 2) are especially the setting of variable data among constraint conditions.

As evidenced by the above-mentioned descriptions of (Formula 1) to (Formula 4), the descriptions of repetitive loops, which are necessary for the procedural programming method, such as 0→total ("→" indicates assignment and hereinafter referred to as such), total+subtotal[1]→total, total+subtotal[2]→total, total+subtotal[3]→total, and total+subtotal[4]→total, are unnecessary for the declarative programming method.

(B) Example 2 of Constraint Conditions $$\text{string name, message, outputs, output;} \quad \text{(Formula 5)}$$

$$\text{name="Tokkyo Taro"} \quad \text{(Formula 6)}$$

$$\text{message="Hello. This sentence is part of HTML texts."} \quad \text{(Formula 7)}$$

$$\text{outputs="Name" \& name \& "<BR>Message" \& message;} \quad \text{(Formula 8)}$$

$$\text{output="<HTML><BODY>" \& outputs \& "</BODY></HTML>} \quad \text{(Formula 9)}$$

Above-mentioned (Formula 5) is the definition of variable data, (Formula 6) and (Formula 7) are value assignments to the variables, and above-mentioned (Formula 8) and (Formula 9) are specific execution formulas. Besides, the operator & is a string concatenation operator. As shown in (Formula 6) and (Formula 7) above, HTML texts, which are output with "output" after arbitrarily rewriting "name" and "message," are generated.

(C) Example 3 of Constraint Conditions

The constraint conditions that describe the operation to continuously concatenate a string "str" to another string "add" are shown as follows.

$$\text{string str;} \quad \text{(Formula 10)}$$

$$\text{string add;} \quad \text{(Formula 11)}$$

$$\text{str=str \& add} \quad \text{(Formula 12)}$$

Above-mentioned (Formula 10) and (Formula 11) are the definitions of variable data, and above-mentioned (Formula 12) is a specific execution formula. The constraint propagation caused by the value change of the string "str" in this example is that the value of the string "add" is repeatedly added to the string "str" every time the value of the string "add" is changed.

Here it must be noted that constraint conditions do not have to be such formulas expressed with equal signs or inequality signs that are shown in above-mentioned (A) to (C). Besides, as for the evaluation of the constraints, true or false is finally given as an answer, and as is the case with C language and others, for example, if only f(x) is described as a constraint condition, this f(x) is executed, and the result is judged and processed depending on whether it is true or false.

Variable Value Resetting 5 sets the first solutions that are given with Constraint Condition Calculation 4 as new values, that is, variation values, so that the second and later solutions are given with Constraint Condition Extraction 3 and Constraint Condition Calculation 4. Besides, a series of procedures to search for the solutions of the constraint conditions terminate when the Constraint-based Solver 100 receives the end command separately after the final solution is attained without any further solution to be modified with Constraint Condition Calculation 4.

As mentioned above, one of the characteristics of the present invention is to repeatedly give the solutions of each constraint condition in order by assigning values to the variables of each constraint condition that is extracted. To enable this, it is based on the premise that the user sets up the constraint conditions in advance in consideration of the procedure of constraint propagation.

By the way, if it lapses into the conditions of solution inability that the solution cannot be given or solution indetermination that the solution cannot be specified during the process of Constraint Condition Calculation 4, they are output as program errors by seeing to it that appropriate exception handling, which is previously defined on the computer, is executed. However, that indicates the user has defined constraint conditions that cannot be solved. As for Constraint-based Solver 100, the user shoulders the burden that constraint conditions must be set up in consideration of the procedures of the computer so that they will be procedures which must be essentially soluble, which is much easier work compared to that of the conventional procedural programming method.

Overall Operation of the Constraint-based Solver 100

Figure 2:
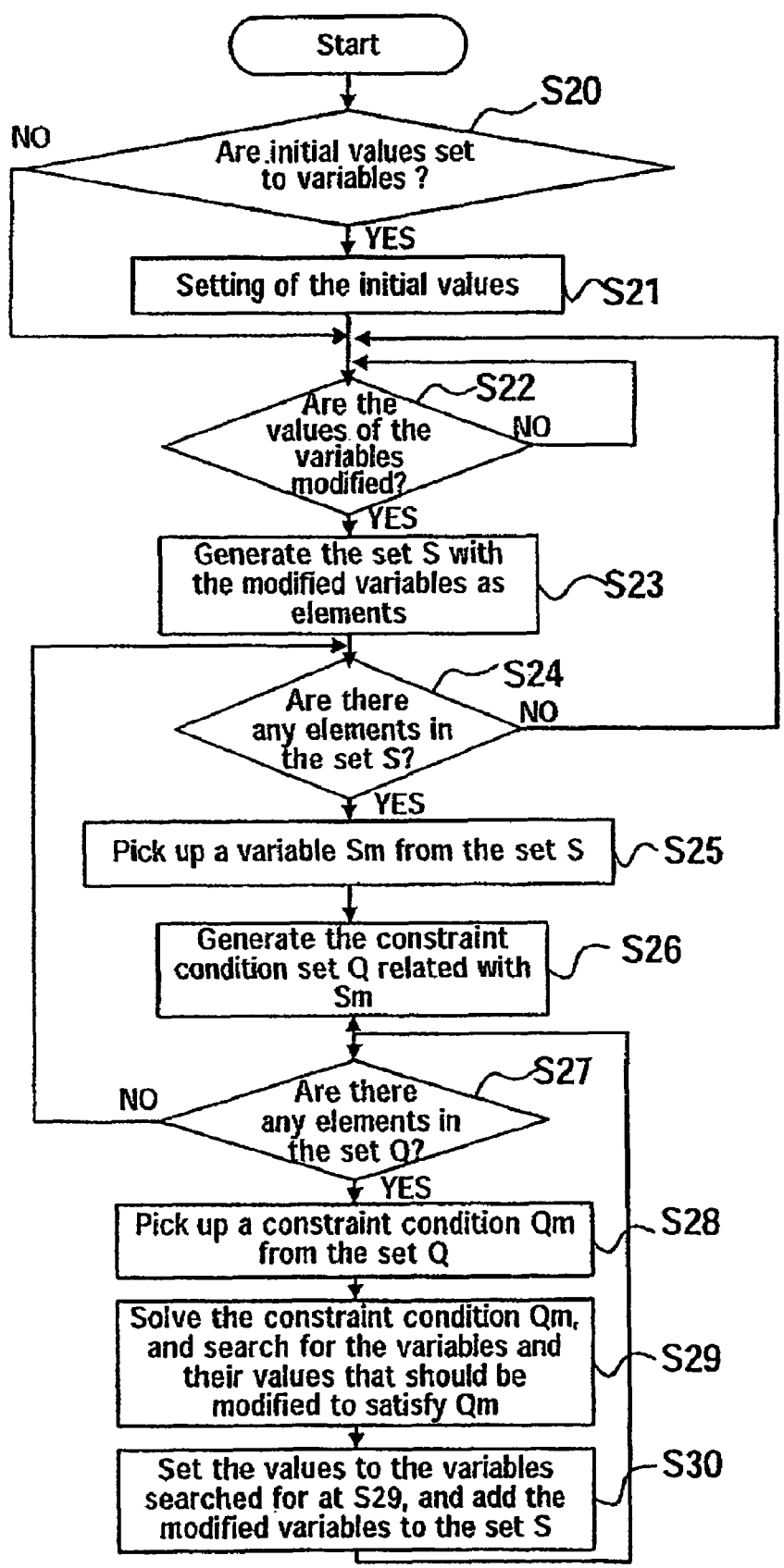
FIG. 2 This is the flow chart that shows the operation order of the Constraint-based Solver in the first embodiment of the present invention.

Then, the overall operation of the Constraint-based Solver 100 with the aforementioned configuration is explained. FIG. 2 is the flow chart showing the operation order of the Constraint-based Solver 100. At first, whether initial values are set to variables, which are used in constraint conditions, or not is judged in the step S20. As a result of the above-mentioned judgment, if initial values have not been set to each variable that comprises constraint conditions which are input by Constraint Condition Inputting 1, Variable Value Setting 2 sets the initial values designated by the user in the step S21.

Then, Constraint Condition Extraction 3 judges if the values of each variable have been modified or not in the step S22. When initial values are set to variables as constraints, it is regarded as the first modification and proceeds to the next step S22. Once the initial values are set and the after-mentioned procedures of the steps are finished, the Constraint-based Solver 100 maintains the waiting condition until the new value modification of variables are executed in this step S22. In addition, although "completion" is not shown in this flow chart, when the indication command of operation completion is input externally, the Constraint-based Solver 100 is controlled so that it will execute the predefined operating process (not shown in the figure) and will terminate a series of operations.

In the step S23, Constraint Condition Extraction 3 generates the set S that has the variables modified in the step S22 as its elements. Here generating the set S means, for example, writing suffixes, with which the above-mentioned modified names of variables and the array elements of variables can be identified, in a certain memory area on the computer, and so forth. In addition, Constraint Condition Extraction 3 judges whether there are any elements in the above-mentioned set S, that is, any variables of which the values have been modified with Variable Value Setting 2 (the step S24). As a result of the above-mentioned judgment, when there are elements in the set S (when the set S is not an empty set), Constraint Condition Extraction 3 picks up the element Sm one by one (the step S25).

Then, the set Q of the constraints related to the element Sm, which is picked up as mentioned above, is generated in the step S26. That is, if there are any constraint conditions that are comprised including the element Sm, Constraint Condition Extraction 3 output them to the set Q. Then, while there are elements in the above-mentioned set Q in the step S27, the following steps S28 to S30 are executed repeatedly.

In the step S28, Constraint Condition Calculation 4 picks up a constraint condition Qm from the set Q. And Constraint Condition Calculation 4 solves the constraint condition Qm picked up in the step S28, and searches for variables and their values that should be modified so as to satisfy the constraint condition Qm (the step S29). Here is the detailed content of the process in the step S29.

(1) Whether the constraint condition Qm is satisfied or not is checked, and if it is satisfied, the present step S29 is completed.
(2) Variables and their values which should be modified to satisfy the constraint condition Qm are searched for.
(3) Whether the values of variables that are searched for in the item (2) above are true or not is verified.

Although the item (2) above is indispensable as the process in the step S29, the other items (1) and (3) are not necessarily so. The user may judge whether they are necessary or not in accordance with the target problems, and comprise so that they are explicitly or implicitly designated as constraint conditions.

Furthermore, in the step S30, Variable Value Resetting 5 resets the values of the variables that are searched for in the step S29, and in the following process the constraint conditions are solved based on the values that are reset. Therefore, when a certain variable is modified, if there are multiple constraint conditions that are related to the variable, the solutions of each constraint condition, which are picked up one by one, are given in order, and simultaneously, the variables are added to the end of the set S by the solutions that are acquired.

One the other hand, as a result of the constraint condition Qm being picked up by the step S28, if it is judged that there is no element in the set Q at the step S27, a series of processes return to the step 24, and the next variable Sm is picked up from the set S, repeating the similar processes. As a result, when there is no more element in the set S, it is equivalent to be the situation that has entered a stable condition as for the process of the Constraint-based Solver 100, and as mentioned before, it gets into the waiting condition at the step S22 until a new value is set for any variable that is used for the constraint conditions.

In this embodiment, as for the order in which the variables Sm are picked up when there are multiple variables Sm in the set S at the step S25, and the order in which the constraint condition Qm is picked up at the step S28, in consideration of the processing procedures for constraint propagation, the constraint condition is set so that the user explicitly designates the order (order of priority) and let the computer execute it Specifically, for example, the priority order is attained by predetermining that it is the order the constraint conditions are described. The concrete examples on this matter are shown below.

The aforementioned accounting calculation problem is used again. The constraints are as follows:

$$\text{price}[1]=100, \text{price}[2]=200, \text{price}[3]=300, \text{price}[4]=50 \quad \text{(Formula 1)}$$

$$\text{quantity}[1]=2, \text{quantity}[2]=3, \text{quantity}[3]=2, \text{quantity}[4]=3 \quad \text{(Formula 2)}$$

$$\text{subtotal}[i]=\text{price}[i]*\text{quantity}[i](i=1 \text{ to } 4) \quad \text{(Formula 3)}$$

$$\text{total}=\Sigma\text{subtotal}[i](i=1 \text{ to } 4) \quad \text{(Formula 4)}$$

There is some meaning in the description order of (Formula 1) to (Formula 4) mentioned above. For example, the constraint condition (constraint) which is described first has the highest priority, and the following constraint conditions have less high priority in order. In this case, the value setting for each variable by (Formula 1) and (Formula 2) is preferentially executed, and (Formula 3) and (Formula 4) mean that the constraints are registered inside the computer afterward. The execution order of the constraints is determined on execution, but the order in which the elements are picked up from the set S and the set Q is uncertain. As explicit methods to determine that, there are methods of judging from the description order or setting the order of priority in the constraints.

In addition, it is also acceptable to configure the aforementioned order of priority so that the computer (CPU) executes it automatically. In this case, the user needs to set the constraint conditions consisting of the content and the description order that will not cause any contradiction during the calculation processes, in whatever order the computer execute them, but this task can be executed easily if the user has normal knowledge and experience as a programmer.

Then, the operation order shown on FIG. 2 is explained, using the example of the aforementioned accounting calculation, following the changes of the variable values in the specific constraint conditions. For example, suppose price[2] is changed from 200 to 250. Because it is not the setting of initial value but the change of data, it proceeds from the step S20 to the step S22. As a result of the step S23, the set S={price[2]}. Because it can be judged that there are some elements in the set S at the step S24, price[2] is picked up at the step S25.

Then, subtotal[2]=price[2]*quantity[2], the constraint condition which is related only to price[2], becomes the element of the set Q at the step S26. In short, the set Q={subtotal[2]=price[2]*quantity[2]} is generated. Then, because it can be judged that there are some elements in the set Q at the step S27, the constraint condition, subtotal[2]=price[2]*quantity[2], is picked up. The solution of the constraint condition, that is, subtotal[2]=250*3=750 is calculated at the step S29. This modified value 750 is set for subtotal[2] at the step 30. subtotal[2] is added to the set S. Then, the set S={subtotal[2]} is generated.

And it returns to the step S27, but because the set Q is an empty set after picking up the only element from the previous set Q, it proceeds to the step S24 afterwards. At the step S24, subtotal[2], which has just been added in the set S, is judged and this subtotal[2] is picked up at the step S25.

Then, the set Q, which has the constraint condition which is related only to subtotal [2], total=Σ subtotal[i] (i=1 to 4), as its element, is generated. That is, the set Q={total=Σsubtotal[i] (i=1 to 4)} is generated. The relevant constraint conditions are picked up at the step S28, and the solution of the constraint conditions, that is, total=200+750+600 +150=1700 is calculated at the step S29, and the modified value 1700 is set for the variable (total) at the step S30. Simultaneously, the variable (total) is stored in the set S. Subsequently, because the steps S27, S24, S25, and S26 have been executed, and no constraint that is related exits, there is no element to be added to the set Q. In this case, it is possible to simplify it to shorten the calculation time as follows. Namely, at the step S29, when the solution of the constraint conditions is searched, addition is not executed again, but only the changed values are utilized and difference is dissolved. And, at the step S30, because it is known that there is no constraint condition that is related to total, to shorten the calculation time, it is arranged so that no element is added to the set S.

Again, it returns to the step S27, but because the set Q is an empty set after picking up the only element from the previous set Q, it proceeds to the step S22, and the Constraint-based Solver 100 maintains the waiting condition until there is next data modification from outside. By the way, as for the aforementioned process at the step S28 on the operation of the Constraint-based Solver 100, the process of picking up the constraint conditions Qm one by one to search for the solution has been explained, but they do not necessarily have to be picked up one by one. When it is possible to give the solutions of the constraints simultaneously, two or more constraint conditions are to be picked up from the set Q. Herewith, soluble target problems may become wide-ranged. Furthermore, the actual solution method of the constraint conditions Qm is not limited to the way of solving with simple formula transformation like accounting problems. The solution method with regard to existing formulas can entirely be used, and accordingly, it is permitted to introduce the solution method of n-th degree equations.

In addition, as another specific example, the processes of addition and deletion of the number of data itself, which are used for constraint conditions, are explained. In the aforementioned example of accounting calculation, the variables of price and quantity are expressed in arrays respectively and the number of the data was fixed to four to set up the constraint conditions, but the constraint conditions, in which the number of data itself is set as a variable, are considered. By adding price[5] and quantity[5] to the present constraint conditions, the following modification is performed.

price[1]=100, price[2]=250, price[3]=300, price[4]=50, price[5]=310 (Formula 13)

quantity[1]=2, quantity[2]=3, quantity[3]=2, quantity[4]=3, quantity[5]=3 (Formula 14)

totalitems=5 (Formula 15)

subtotal[i]=price[i]*quantity[i](i=1 to 4) (Formula 16)

total=Σ subtotal[i](i=1 to totalitems) (Formula 17)

If the aforementioned process is executed completely similarly:

subtotal[5]=price[5]*quantity[5]=310*3=930 total=Σsubtotal[i]=200+750+600+150+930=2630

Thus, it is possible to search for solution without leaving any constraint conditions that remain unsolved. This kind of modification is similar when variables or constraint conditions are deleted, and it is also possible to modify the number of variables expressed with variable length arrays.

The screen examples of the user inputting these constraint conditions and values, making use of the actual input-output (for example, Constraint Condition Inputting 1) are shown on FIG. 24. By the way, the screen examples of FIG. 24 are equivalent to the screen examples of Constraint Condition Inputting 1 and Variable Value Setting 2, and they are the execution examples in which input-output interface for UNIX is mounted as a structure, which is equivalent to general programming language. Though input and output from (a) to (h) in FIG. 24 are sequential, they are displayed separately for convenience. As shown in FIG. 24(a), the user inputs 'ripple' after the UNIX prompt, which is indicated with '$' (FIG. 24(b)). As a result, the programs which the processes of the present invention are mounted are loaded, and the user is prompted to input data with the indication of '%' on the screen (the data input by the user are displayed after '%', and on the line directly after starting anew line, the data values and calculation output values that are received are displayed).

Then, the user inputs the initial constraints (FIG. 24(c) 241). Though as for the constraint 242, sum calculation is abstracted as the function totalarray( ) here, it can also be expressed with the constraint shown in FIG. 21. In addition, it is also possible to directly describe procedural loop structures (refer to fusion with the functional programming language). And when the difference dissolution of sum calculation is realized in the process at the step S29, the side of the Constraint-based Solver 100 judges and automatically processes it, and the user is not conscious of that.

Then, the user sets the initial values (FIG. 24(d) 243 and 244). Though the processes that are shown in the steps from S22 to S30 are executed, when they are clearly unnecessary in consideration of operation efficiency, it is possible to prevent them from being executed in the judgment of the Constraint-based Solver 100 or the user's explicit command. At FIG. 24(e) 245, remaining input values are read into from files by 'load'. At this point, subtotal and total have been calculated and already set, and through inputting 'total' at 246, the current total value is displayed and the execution result can be acquired. When FIG. 24(f) 247 is input, the step S26 in FIG. 2 is executed. And there is no screen output during the calculation, but the processes indicated in the steps from S22 to S30 are executed, and the total value of execution result is displayed as a result of inputting of 248. Inputting of 249 and 250 is the additional setting of the number of data which are used for constraint conditions. And the total value is displayed in execution result as a result of inputting FIG. 24 (g) 251, the end command is issued as a result of inputting FIG. 24(h) 252.

Figure 20:
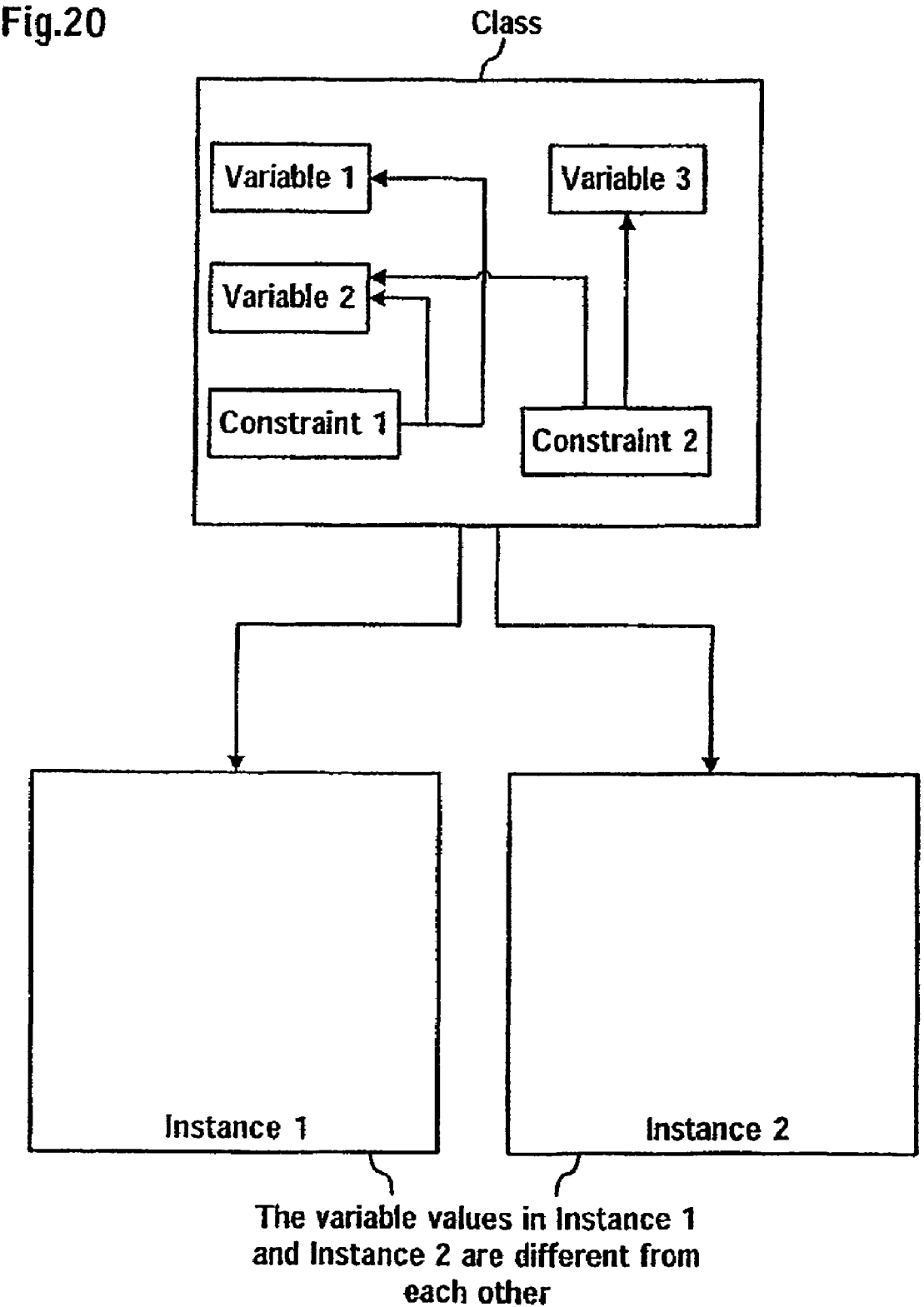
FIG. 20 This is the drawing that shows the concepts regarding classification putting data definitions together with constraints FIG. 21 This is the drawing that shows the example of operators in accessing the constraint conditions of the array structures.

In addition, it is also acceptable to put together and define some data definition and constraints as one class in classification concept, give them parameters to make them instances, and configure to make the set of the constraints and values. As a result, as for the constraint conditions and variables that have complicated setting conditions, they can be divided by function and made into modules. This is convenient in developing practical system designs and programming language systems. The concept with regard to this classification is shown in FIG. 20. This class can be inherited. For example, when there are class A including Variable 1, Variable 2 and Constraint 1 and Class B including Variable 3, it is possible to inherit these Class A and Class B, and additionally generate the class which has inherited Constraint 2 in FIG. 20.

By the way, as seen from the configuration and 2operation of the Constraint-based Solver 100 in this embodiment, for example, there is no setting of evaluation formula (evaluation condition) that no constraint condition violates constraint. In the conventional declarative programming method, there are many cases that it is judged whether any contradiction exists among constraint conditions based on the relevant evaluation formula when the solutions of constraint conditions is searched for. In the present invention, it is assumed that when the user sets the constraint conditions, he/she sets them without causing any contradictions. Therefore, the Constraint-based Solver 100 can search for the solution in the end without fail, and if the solution is not searched for, the user has failed to set the constraint conditions correctly. Evaluation formulas with regard to the existence of constraint violation are unnecessary on execution, but needless to say, it is helpful to cope with problems such as debugs and discovery of mistakes to prepare them as an auxiliary function.

According to the Constraint-based Solver 100 if this embodiment, when constraint conditions with regard to the target problems and the initial values or variation values are set for the variables to be used for the relevant constraints, it is configured so that the constraint conditions related to the variables are extracted, the solutions of each constraint conditions are solved one by one, and the solutions given are set as new variable values to repeat the solution searching, so it becomes possible to solve target problems with any data structure and the constraint conditions that connect between data from the data structure. That is, the constraint conditions which are set are configured so that without describing any algorithms to solve target problems like conventional procedural programming, after the commands which are equivalent to these algorithms are included in the data structure, they are described along with the procedures of constraint propagation, and the solutions of each constraint condition are searched for one by one without searching for the most appropriate solution that satisfies all constraint conditions, so the course of solution searching becomes clear, and it becomes possible to surely reach the final solution and dramatically speed up computing, because each markedly simplified constraint condition (for example, linear equations) has only to be solved.

In addition, because the solution method of problems can be directly described in the constraint conditions, the user doesn't necessarily have to have special professional knowledge of conventional programming language, and he/she can solve target problems easily.

The Second Embodiment

In the aforementioned first embodiment, as for the Constraint-based Solver 100, it is configured so that Constraint Condition Inputting 1, Variable Value Setting 2, Constraint Condition Extraction 3, Constraint Condition Calculation 4, and Variable Value Resetting 5 are included, but it is the characteristics of the Constraint-based Solver 200 in this embodiment, in addition to each configuration 1 to 5, that Constraint Condition Storage 6 and Variable Value Storage 7 are equipped. By the way, as for the common configuration parts between the configuration of the Constraint-based Solver 200 in this embodiment and that of the Constraint-based Solver 100 in the first embodiment, same signs are attached to such parts, and detailed explanation is to be omitted.

The overall configuration of the Constraint-based Solver 200 in this embodiment is shown in FIG. 3. Constraint Condition Storage 6 stores the constraint conditions that are input through Constraint Condition Inputting 1 in the prescribed memory area. In addition, Variable Value Storage 7 stores the variable values (initial values and variation values) that are set though Variable Value Setting 2. Besides, Constraint Condition Extraction 8 in this embodiment, in addition to the functions of Constraint Condition Extraction 3 in the first embodiment, has the function to compare the newly set constraint conditions or variation values to the constraint conditions or values that are stored in the aforementioned memory area, and to extract constraint conditions only when they are not consistent with each other. By the way, needless to say, Constraint Condition Extraction 8 is not always required to execute the aforementioned comparison, and it is acceptable to extract constraint conditions and variable values from Constraint Condition Storage 6 and Variable Value Storage 7.

Figure 5:
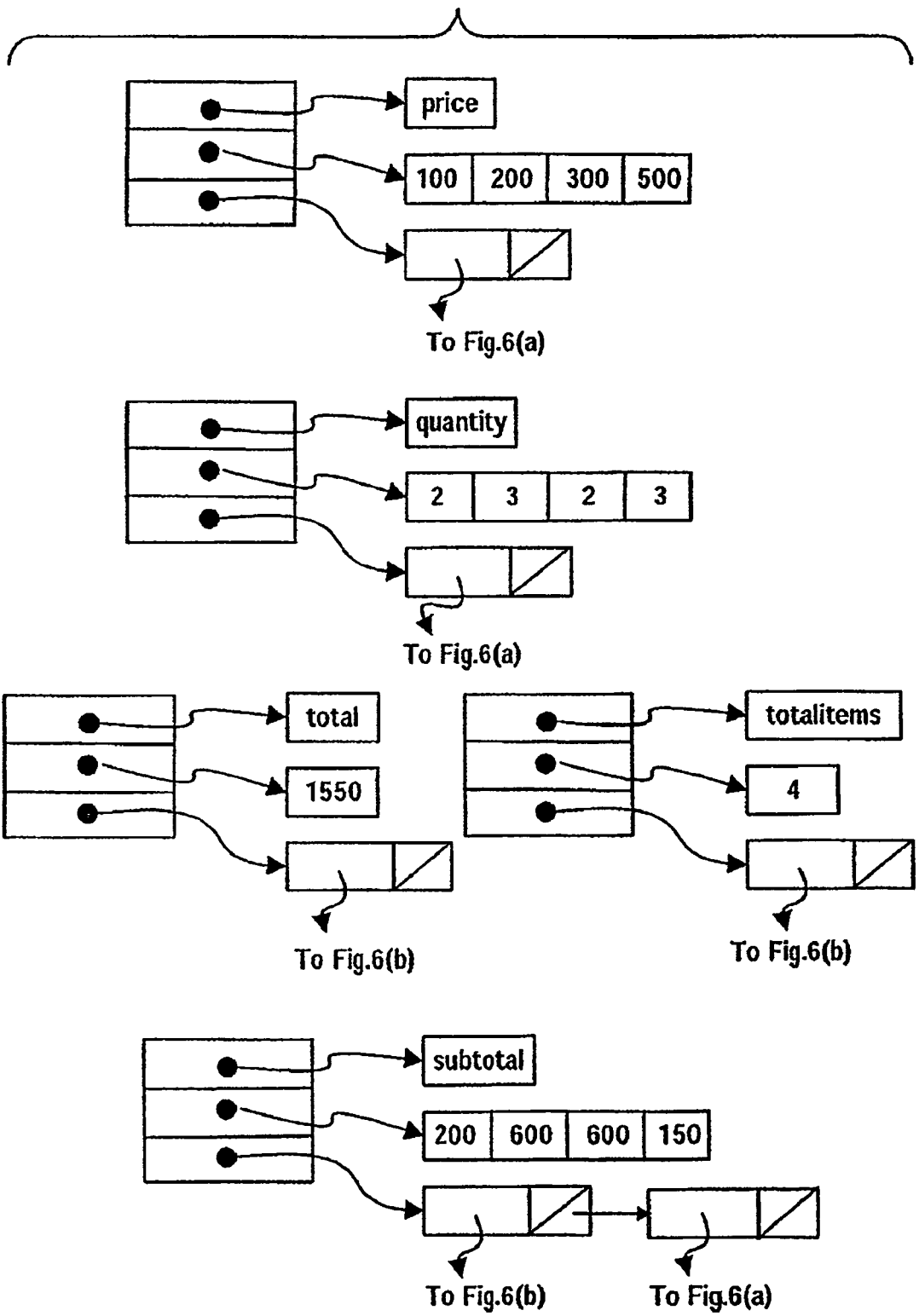
FIG. 5 This is the drawing that shows one example of the data structure with regard to accounting calculation problems.

FIG. 4(a) is a drawing to show the mode example of Constraint Condition Storage 6 storing constraint conditions into memory areas of computers (for example, memories and magnetic disks). That is, assuming that there is a constraint condition referring to the variable X with 3 constraint formulas (Constraint 1, Constraint 2, and Constraint 3), the expression method of memory area when the value 246 is set for this variable X is shown. An example of the constraint conditions of the aforementioned accounting calculation problem being expressed in this form is shown in FIG. 6 and FIG. 5.

For example, as shown in FIG. 4(b), the formula (x=y+z) is stored after being divided. However, it is not limited to this expression method. As the storage mode of constraint conditions, it is not necessarily required to divide the memory area into values and constraints, and for example, it is acceptable not to divide the constraint conditions as a structure and have them as letter strings. In addition, it is not limited to the data structure shown in FIG. 5, and such memory method of data as is shown below is also accepted.

- The variable values are divided into types, and certain values are recorded only on the memory, but as for the other values, the values on the memory area may be permanent through recording them into files and databases, or may have special meanings in terms of the time system and so on.
- It is not necessary to indicate the variable names with pointers, and they may be directly held.
- The values of variables are not necessarily kept directly.
- Because it is not necessary to identify variables in compiling the programs and others, the variable names are not essential.
- Constraints used for constraint conditions do not have to be a list.

Figure 7:
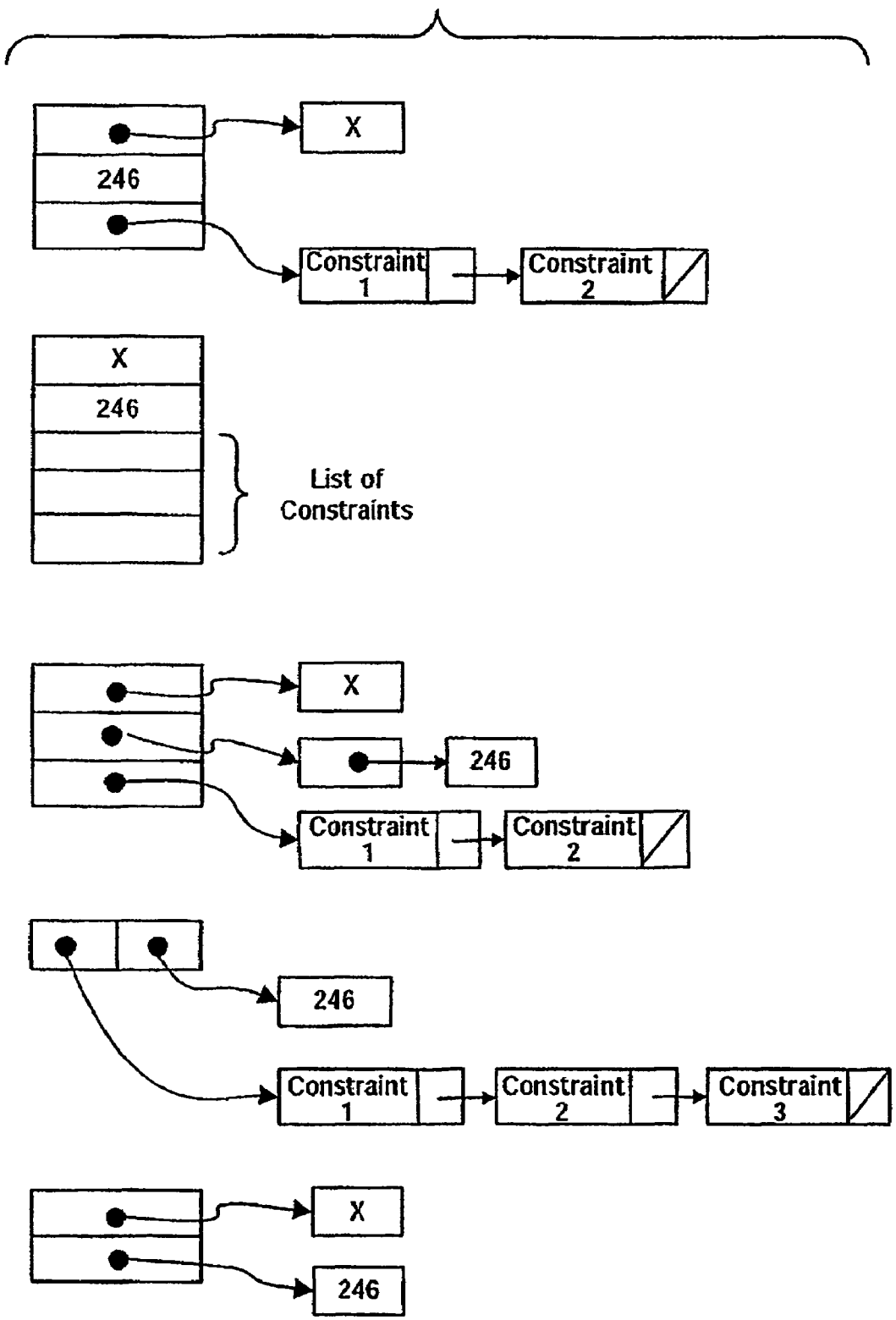
FIG. 7 This is the drawing that shows one example of the data structure.

It is acceptable not to have any constraint lists, and as shown in FIG. 7, it may be the configuration to search for constraints from variable names. However, it is not limited to the configuration of memories and pointers as shown in FIG. 7.

In addition, all data types that innumerably exist because of the above-mentioned transformation are to be included.

According to the Constraint-based Solver 200 in this embodiment, because it is configured so that the initial values or variation values of the variables that are used for the constraint conditions with regard to the target problems and relevant constraint conditions are temporarily or permanently kept, it is possible for Constraint Condition Extraction 8 to execute the processes to search for the variables and their values that require modification to satisfy the constraint condition Qm through solving Qm, which is related to the modified variable Sm. As a result, even though there may be any modification of constraint conditions, there are some cases when it is not necessary to recalculate every multiple constraint condition from scratch, thus achieving efficiency of calculation time.

The Third Embodiment

Figure 8:
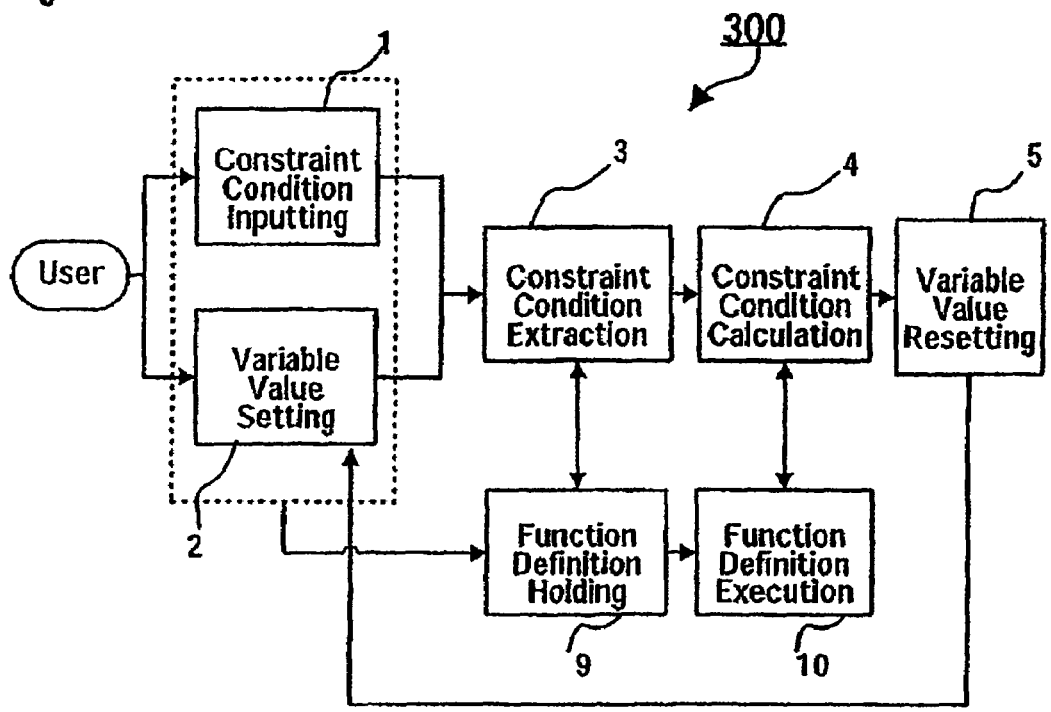
FIG. 8 This is the overall configuration drawing of the Constraint-based Solver in the third embodiment of the present invention.

As for the Constraint-based Solver 100 in the aforementioned first embodiment, it is configured so that Constraint Condition Inputting 1, Variable Value Setting 2, Constraint Condition Extraction 3, Constraint Condition Calculation 4, and Variable Value Resetting 5 are included, and as for the Constraint-based Solver 200 in the aforementioned second embodiment, it is configured so that additionally Constraint Condition Storage 6 and Variable Value Storage 7 are equipped, but as for the Constraint-based Solver 300, as shown in FIG. 8, it is characterized in that it is equipped with Function Definition Holding 9 and Function Definition Execution 10. The configuration of either of the Constraint-based Solver 100 in the first embodiment or the Constraint-based Solver 200 in the Second embodiment can be turned into the one which is additionally equipped with Function Definition Holding 9 and Function Definition Execution 10, but to simplify the explanation, the configuration that they are added to the Constraint-based Solver 100 is explained. By the way, as for the common configuration parts between the configuration of the Constraint-based Solver 300 in this embodiment and that of the Constraint-based Solver 100 in the first embodiment, same signs are attached to such parts, and detailed explanation is to be omitted.

The role which of the Constraint-based Solver 300 in this embodiment has from the viewpoint of programming technique is that the third embodiment fuses the procedural programming method, while the first embodiment executes problem solution with the complete declarative programming method. This is to accomplish flexible problem solution for whatever target problems through trying to use the procedural programming method as for the partial problems that are difficult to solve with the declarative programming method.

The overall configuration of the Constraint-based Solver 300 in this embodiment is shown in FIG. 8. Function Definition Holding 9 holds the procedures and variable values that the user describes in the conventional procedural programming method through Constraint Condition Inputting 1 and Variable Value Setting 2. Function Definition Holding 9 is connected to Constraint Condition Extraction 3 so that they can input-output data mutually. By the way, it is not necessarily required to be the configuration to permit procedural description other than constraint conditions as in Constraint Condition Inputting 1 in this embodiment. For example, it is acceptable to be the configuration that inputting is exclusively for procedural description is equipped additionally. It also applies to Variable Value Setting 2, and it is acceptable to equip the variable value setting exclusively for the procedures that are described in procedural way.

Function Definition Holding 10 actually makes the computer execute the procedures that are held with Function Definition Holding 9. Also, Function Definition Execution 10 is connected to Constraint Condition Calculation 4 so that they can input-output data mutually.

The processes of the Constraint-based Solver 300 in this embodiment are explained with specific examples. Now, assume the case when y=sin(x), y=a function with no inverse function (x) or something is included in the constraints that are described as constraint conditions. In this case, at the step S29 shown in FIG. 2, when the procedure for formula transformation of $x=\sin^{-1}(y)$ is tried to search for the value of the variable x, in relation to the value domain of the inverse function, there are some cases when the value of x is impossible to be searched for. Also, as for y=a function with no inverse function f(x), it is impossible to search for the value of x with the value of y. In such cases, user functions in conventional procedural programming are freely introduced and handle them.

For example, in solving constraints, it is set so that solution methods can be chosen from multiple options. Assuming that the constraint condition is a=f(b), to search for the value of the variable b, it is set that {a=f(b), b=f_inv(a)} is prepared and the constraints can be solved if either of them can be applied. Also, if the values of the variables l and m are not determined in the constraint y=f(l, m), or if it is the case of inequality like y>x, the relevant constraints cannot be solved easily. In case of the inequality y>x, when the value of x turns out to be n, the only information that can be obtained is that y is bigger than n, and the final solution of the value of the variable y can also be said to be unknown. In these cases, other than processing them as the setting errors of the constraint conditions, it is acceptable to let the process continue through assigning the information of y>n to the related constraints as it is. It also applies to z=x+y, which cannot be solved if only one equation is paid attention to, and it can also be solved through permitting that simultaneous equations are dealt with among multiple formulas and multiple values.

That is because, as a result, there are some cases when the value of the variable y can be definable in relation to the conditions of the other constraints or can be narrowed down more, or y>n can be realized as a solution as it is. As just described, it tries to solve them wherever possible when it is possible to solve them with the other constraints, dealing with inequality and such as they are, not defined values as variable values. That is, Constraint Condition Extraction 3 in this case executes the solution method which has the relationship shown in FIG. 9. If the value of x in the constraints in FIG. 9 is modified, all the formulas (Solution Methods 1 to 3) that do not have the form of assigning it to x are executed, thus making the solution process of constraints flexible, and it becomes possible to let it have solution ability, in the same way as the conventional procedural programming method, or more than that.

Figure 9:
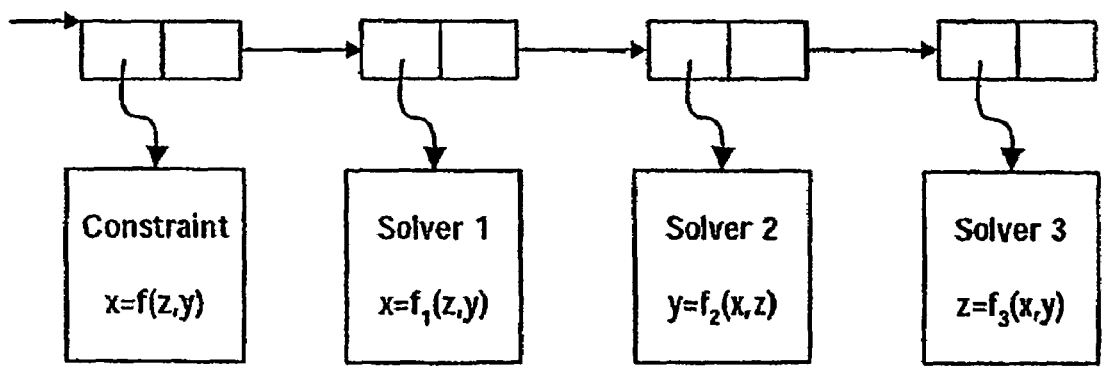
FIG. 9 This is the drawing that shows the construction drawing showing the realization method of the solution method through the Constraint Condition Extraction.

Also, without being limited to the cases when it is difficult to express them as constraints as for the problems of inverse functions and such, as for the formulas which can be normally expressed as constraints, if it is configured so that they are transformed into the form of the solution method as shown in FIG. 9, it is expected to improve the speed in executing the processes.

As just described, as for the Constraint-based Solver 300, it is configured so that Function Definition Holding 9 and Function Definition Execution 10 are included, the constraint conditions, functions that have been defined in the conventional programming, and such are fused, and it becomes possible for the user to shifting between the solution method as constraint conditions and that of conventional programming technique, depending on the quality or the characteristics of target problems. As a result, as for the Constraint-based Solvers 100 and 200 in the first and second embodiment, it becomes markedly easy to describe the constraint conditions that include inverse operation processes that cannot be solved.

The Fourth Embodiment

Figure 10:
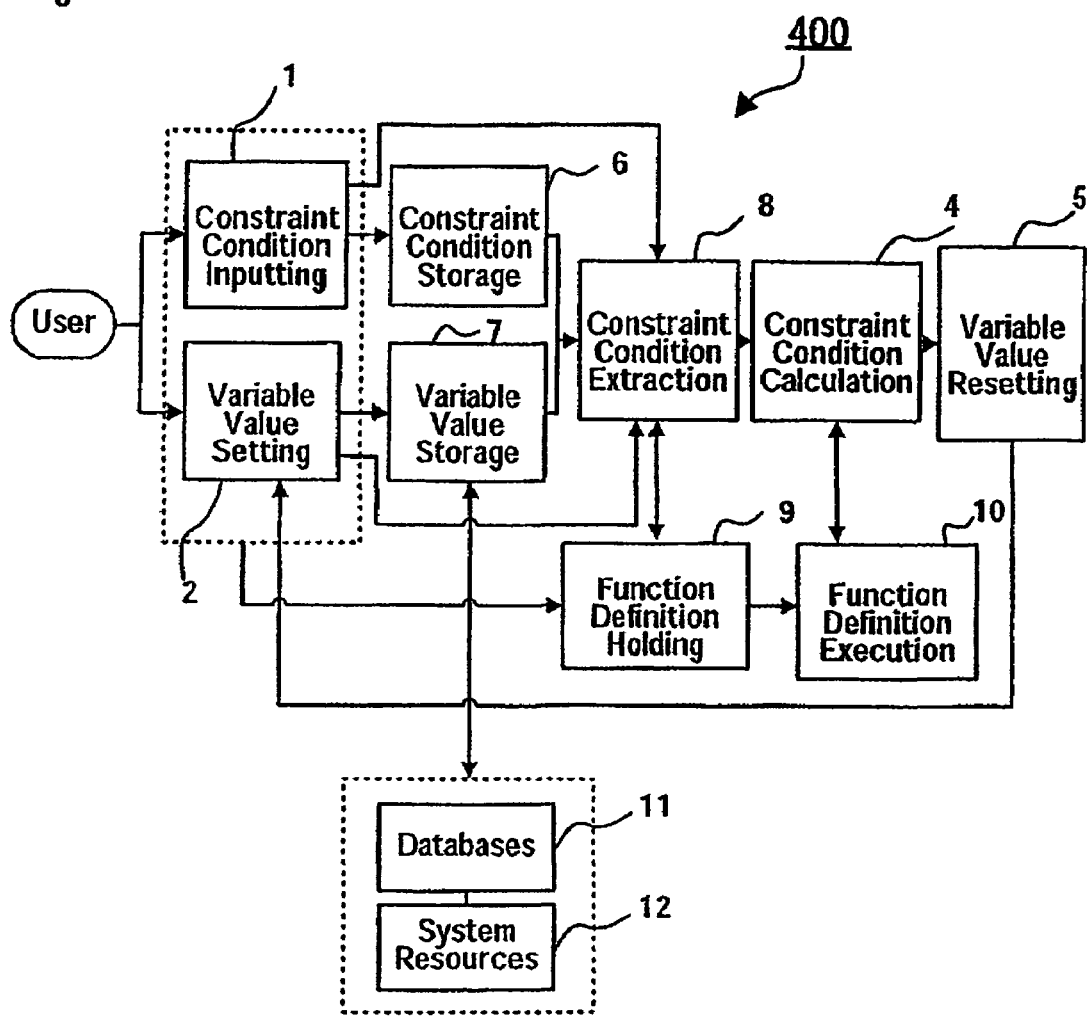
FIG. 10 This is the overall configuration drawing of the Constraint-based Solver in the fourth embodiment of the present invention.

In addition to each aforementioned configuration the Constraint-based Solvers 100, 200 and 300 in the embodiments from the first to the third, the Constraint-based Solver 400 is characterized in that it can set variable values through using information from databases and system resources accordingly. The overall configuration of the Constraint-based Solver 400 in this embodiment is shown in FIG. 10. To simplify the explanation of this embodiment, here is the explanation of the Constraint-based Solver 400, which is configured of the Constraint-based Solver 200 in the second embodiment with addition. Needless to say, information from databases and system resources can be used for the Constraint-based Solvers in the other embodiments. By the way, as for the common configuration parts between the configuration of the Constraint-based Solver 400 in this embodiment and that of the Constraint-based Solver 200 in the second embodiment, same signs are attached to such parts, and detailed explanation is to be omitted.

As shown in FIG. 10, according to the configuration of the Constraint-based Solver 400 in this embodiment, partial or all variables in constraint conditions can be linked with the values recorded in aforementioned databases 11 and system resources 12, and such variables in the system as are linked with other matters like time, thus enabling easy management of variables that consistency between the variables outside the Constraint-based Solver 400 and the variables of constraint conditions is achieved.

Then, some examples that dealing with the variables with more complicated data structures as the content of constraint conditions is possible are shown. The following examples are feasible for all of the Constraint-based Solvers 100, 200, 300 and 400 in the first embodiment to the fourth embodiment.

Constraint Conditions that Define Multiple Values for Variables

Normally, constraint conditions to assign values to variables are, for example, described like x=10, but here it is defined to assign multiple values to the variable x. More specifically, for example, x={10, 11, 12};

Description like this is permitted. In this case, as for computing of addition, subtraction, multiplication and division among variables, if addition is taken as an example, x+y executes+operation for each element of each variable x and y.

Constraint Conditions with Variables of Array Structures of which Operators Are Defined Now, an one-dimensional array vec is considered. This one-dimensional array vec is set as vec={50, 200, 300}, and access for the element of the No. i (0≦i≦letter string length−1) is expressed as vec[i]. Each element of the one-dimensional array vec is vec[0]=50, vec[1]=200, and vec[2]=300.

Here, the operators for the one-dimensional arrays vec1 and vec2 are defined as follows.

vec1+vec2 . . . the array that all the elements of each one-dimensional array are added to vec1−vec2 . . . the array that all the elements of each one-dimensional array are subtracted vec1*vec2 . . . the array that all the elements of each one-dimensional array are multiplied vec1/vec2 . . . the array that all the elements of each one-dimensional array are divided vec1=vec2 . . . this compares whether the elements of each one-dimensional array is the same, or assigns each element in the arrayvec1 & vec2 . . . the array that all the elements of each one-dimensional array are linked By defining the operators for one-dimensional arrays like this, it becomes possible to deal with them as one kind of the constraints without any problems in the aforementioned embodiments from the first to the fourth. To access the constraint conditions of array structures, for example, such operators as shown in FIG. 21 can be prepared, though they are not for limitation. It is possible to use this operator combining it with any function.

In addition, to realize flexible accesses to the elements of the aforementioned one-dimensional arrays, it is enabled to designate domains at vec[i]. Specifically, if vec [n . . . m, l . . . k, i . . . j] expresses an array that the elements of No. n to m, No. l to k, and No. i to j of the dimensional array are picked up and aligned. Such computing as vec1[0 . . . 3]=vec2[0 . . . 1] & vec2[4 . . . 5]+vec3[0 . . . 3] becomes possible, and one-dimensional arrays can be dealt with as constraints (constraint conditions).

For example, if letters are stored in each array element of the aforementioned one-dimensional array (here, it is shown as str), str becomes a letter string. As for the letter string str="HelloWorld!", if any letter is assigned to each str[i], or if the letter string1="Hello" and the letter string2="World!", such constraints that are expressed as the letter sting str=the letter string1 & the letter string2 can be dealt with. Moreover, it becomes possible to describe constraints more flexibly by enabling pattern matching and introducing letter string replacing by regular expression only with letter strings.

By applying this, for example, the HTML (hypertext markup language) outputs by Web, which vary in accordance with the modification of variable values, are described as follows.

date="2003/01/01";
name="Tokkyo Taro";
content="long-passage writing"
HTML_data="<HTML><BODY>" & date[0 . . . 3] & "Year" & date[5 . . . 6] & "Month" & date[8 . . . 9] & "Day" & "Name:" & name & "Content:" & content & "</BODY></HTML>";

Constraint Conditions Equipped with Default Conversion Rules

Conversion rules are prepared with regard to any data conversion, and especially, it is possible to designate them by default. Particularly, in cases where numbers are converted into letter strings, there is a method to use conversion functions every time they are referred to, but preparing the defaults of data conversion rules enables efficient description. As an example, the following rules are prepared.

It is ensured that conversion rules are right aligned.

S stands for signs, and they are—only when numbers are negative, and they are null for the other cases.

Xn stands for a number with n-digits or less.

Yn stands for a number with fixed n-digits.
Zn stands for zero suppression with fixed n-digits.

In this case, for example, in defining variables, float ("SX9.Y3")val1; is defined, val1 can be referred to as a letter string which has a total letter number of 14, fixed three digits on decimal fraction and right alignment. Also, if unsigned int("Z8") val2; is defined, val2 has no sign, and val2 can be referred to as a letter string which has a total letter number of eight of eight digits with zero suppression. Of course, describing directly as val2("Z10") and such in referring to values enables application of not only default rules but also other rules in applying them. This kind of definition of conversion rules by constraint conditions that have default conversion rules enables easy description of constraints in clerical application and such. Needless to say, it can also be applied to other data structures, and the aforementioned one is an example as the format of conversion rules, of which there are many kinds.

Constraint Conditions with Priority Orders

An example of description in cases where weight is added to constraint conditions is shown as follows. {<conditional expression>} [:<a priority order>]; or {<conditional expression>} [:<a priority order>]; →{<the process in case where the conditional expression is not realized>}. Here, it is ensured that, in cases where multiple constraint conditions correspond to each other, the constraints to be executed are selected in accordance with the values of the priority order. Also, it is ensured that, in cases where there are multiple values of the same priority order, all of them are executed. Defining such constraints with priority orders makes it become effective in cases where only the constraint with the highest priority order or the lowest is executed, or the execution order of the constraints is designated.

Constraint Conditions Based on Structures

It is possible to deal with multiple data types in a mass with structures (abstract data structures). If the aforementioned data of Web output is tried to express with this structure, the following expression can be made.

```
struct structure_name {
    date date ;
    name name ;
    string content ;
} bbs_data[ ] ;
```

In the actual Web system, the data of the aforementioned structure turns out to exit in databases and files, and in the case of the aforementioned structure, access to "content" with regard to the array number 5, for example, becomes possible by "bbs_data[5]. content." By the way, with regard to access to the data of this structure, defining the operators of letter string matching for the members (which mean date, name, content and HTML_data) enables to describe searching processes as constraint conditions.

Constraint Conditions for Built in Functions, Additional Operators and Rule Addition Besides, to realize FIG. 12(a) and FIG. 12(b), in which a bit practical example problems are shown, using each aforementioned data structure, some rules are added. By the way, FIG. 12(a) and FIG. 12(b) are supposed to be shown in the same drawing, but they are shown as separate ones. For example, as built in functions, operators and rules, the following are prepared.

vsize(arg) . . . a built in function to search for the size of the array given with an argument arg inttostr(arg) . . . a built in function to convert integers into letter strings strtrunc(arg1, arg2) . . . Though the letter strings of arg1 are copied, if they are longer than the letter string length which is designated with arg2, the letters for that are cut off.

array domain designating operator[*] . . . This is the elements of all the arrays.

Some constraints parenthesized with { } are processed as a block in a mass.

[$i] . . . Though this is similar to index[i] that has already appeared so far, in the constraint conditions massed only in a block, all have the same value. Here, to identify it from normal variables, $i instead of i is used for description.

Accordingly, the following description is possible.

output_block[*]. output_html . . . This is the value array of multiple elements in which all output_html (Refer to FIG. 12(a)) in the array are aligned, and when comparison with letter strings and assignment computing are executed, all the elements are dealt with as a letter string in which they are linked.

vsize(output_block)=list_count . . . This is the constraint to show the relationship between the array number, that is, the array size and the variables. Note, however, that, though reference to the values given with vsize( ) is a normal numeric value, modification is required to mean the modification of the array size, so the abstracted process, which is either of defining it so that it will mean the function call for size modification of which value modification is abstracted inside the process, the process of the method call by objects or the other, is required.

To give input data to the problems that include constraint conditions with each of aforementioned data structure, the user directly modifies the relevant variables, call the procedural function bbs_additem( ), which is shown in FIG. 12(a), and such. And as for the example problems (a) and (b) in FIG. 12, with regard to output, aforementioned output_html is referred to. As a result of above-mentioned processes, Web service can be realized. By the way, output is not required to be limited to the HTML format, and it is also possible to realize input-output service on the server side at any client/server system in the same way.

By the way, though the one-dimensional array vec has been used for explanation so far, needless to say, computing among arrays that have different array length and definition on computing with such arrays and variables can be executed in the same way, much more extension to multidimensional arrays such as two-dimensional arrays. Also, as mentioned above, though an example where it is possible to deal with variables with more complicated data structure as the content of constraint conditions has been shown, it goes without saying that it is not necessary to correspond with these data structures completely, and that transformation examples that skilled person could analogize from these are included.

Figure 11:
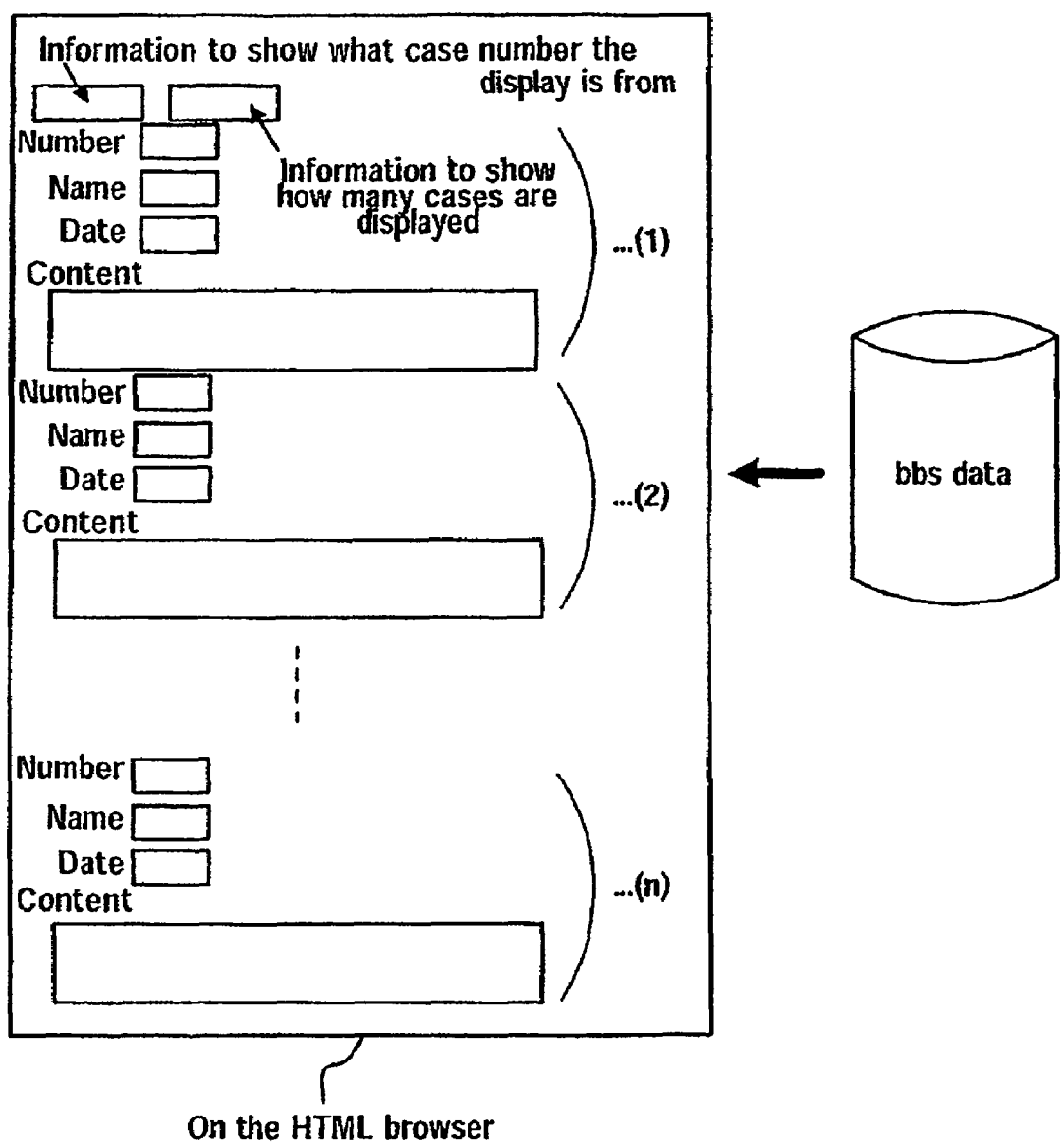
FIG. 11 This is the conceptual drawing of the system that executes data display in combination with the Web server.

As explained above, because it is ensured that constraint conditions can deal with not only numbers but also each data structure, it becomes possible to describe the relationship between data that are presently stored and HTML output by constraint condition (constraints), and it enables to simply describe the programs on the server side of Web applications only with constraint conditions. It is FIG. 11 that shows the conceptual drawing of the system for data input and display with the combination of this Web server, and it is FIG. 12(a)

and (b) that an example of information and constraint conditions which are stored in Function Definition Holding and Constraint Condition Storage in that case.

Figure 13:
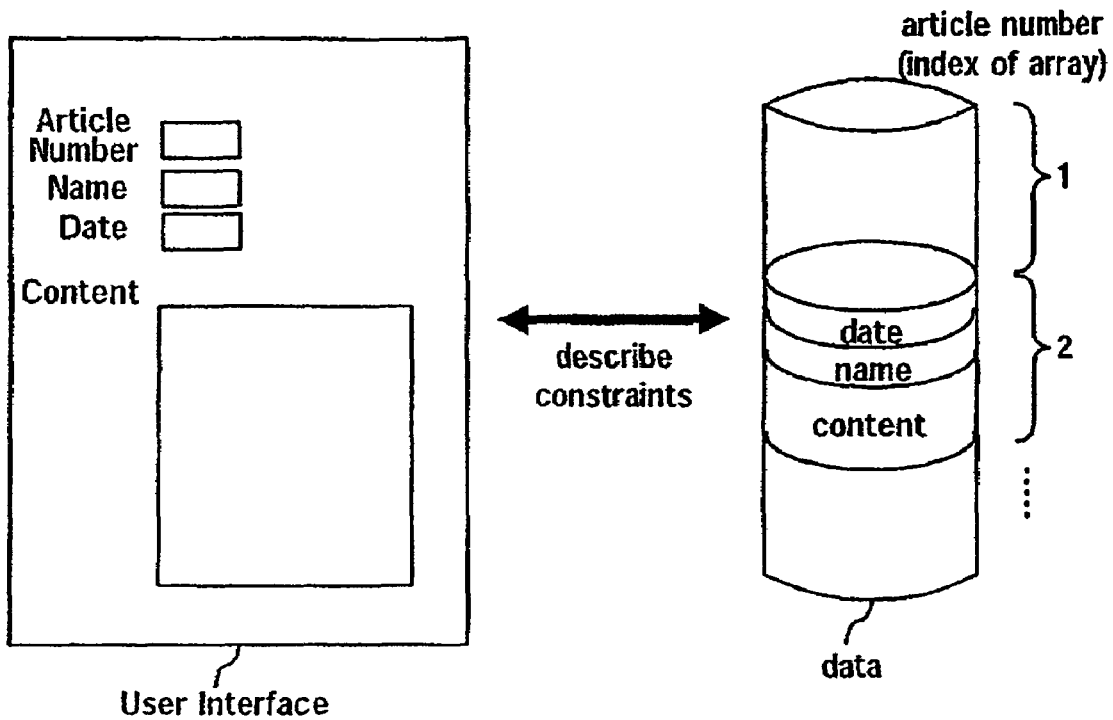
FIG. 13 This is the drawing that shows one example of describing the relationship between data and user interfaces with constraint conditions with regard to general window interfaces.

Also, without limiting to aforementioned HTML on the Web, as for general window interface shown in FIG. 13, configuring it so that each item is mapped to variables, it becomes possible to describe the relationship between data and user interface, and to understand as well as to describe general user interface become easy. As a result, high productivity is realized compared to the conventional programming formalities.

Other Application Examples of the Present Invention: Application Program Construction and Transaction Processes Then, it is explained that the present invention can be applied to the problems on constructing any application program using input interface on the Web, or the processing problems of transaction in operating databases in which any datum is accumulated. As for the aforementioned Constraint-based Solvers in the embodiments from the first to the fourth, having the procedures and processed contents to be solved with constraint conditions as history information (update history) enables to realize the UNDO function, which is one of the concepts of user interface on applications, or the transaction of databases.

As a result of making this UNDO function or the transaction of databases feasible, it becomes easy to uninvent a series of operation to search for constraint solution accompanied with data modification from the start of data update. As a result, it becomes certain and quick to confirm input data, which is discovering errors included in input data through modifying the partial data values of constraint conditions, and to execute the processes to restore the original data values in canceling then.

Figure 14:
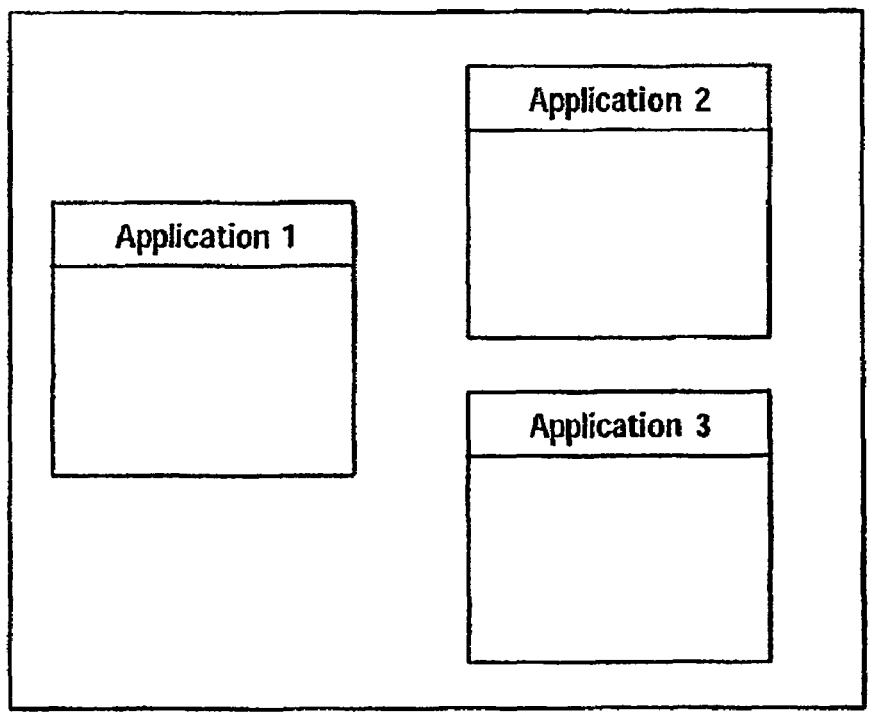
FIG. 14 This is the drawing that shows one example of the multi-window systems.

Then, it is shown that the present invention is applicable to the window systems using windows that are basic screen elements in the GUI environment and the multi-window systems. Here, an example of the window system shown in FIG. 14 is explained. By the way, needless to say, it is possible to deal with any number of windows, though three windows are shown in FIG. 14.

Figure 15:
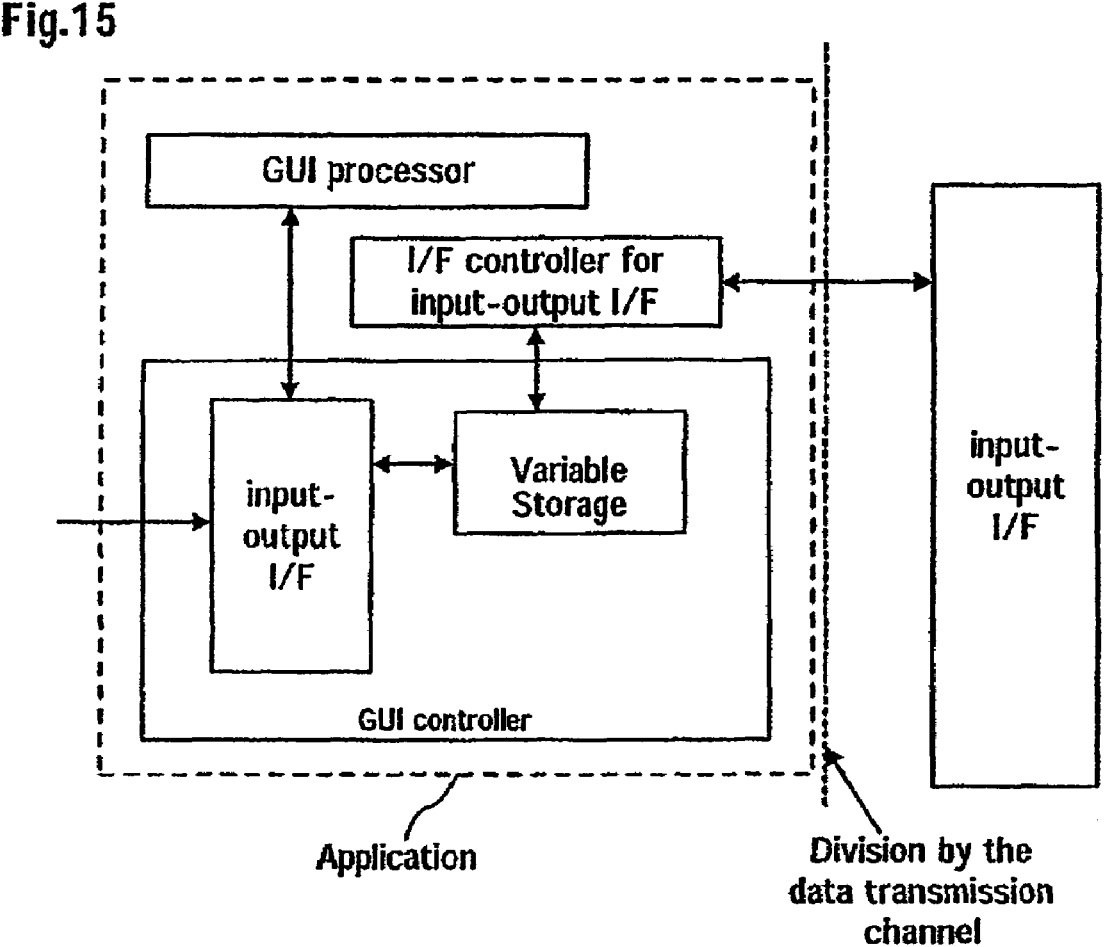
FIG. 15 This is the conceptual drawing that shows the configuration on the client side of the client/server system that realizes the window system.
Figure 16:
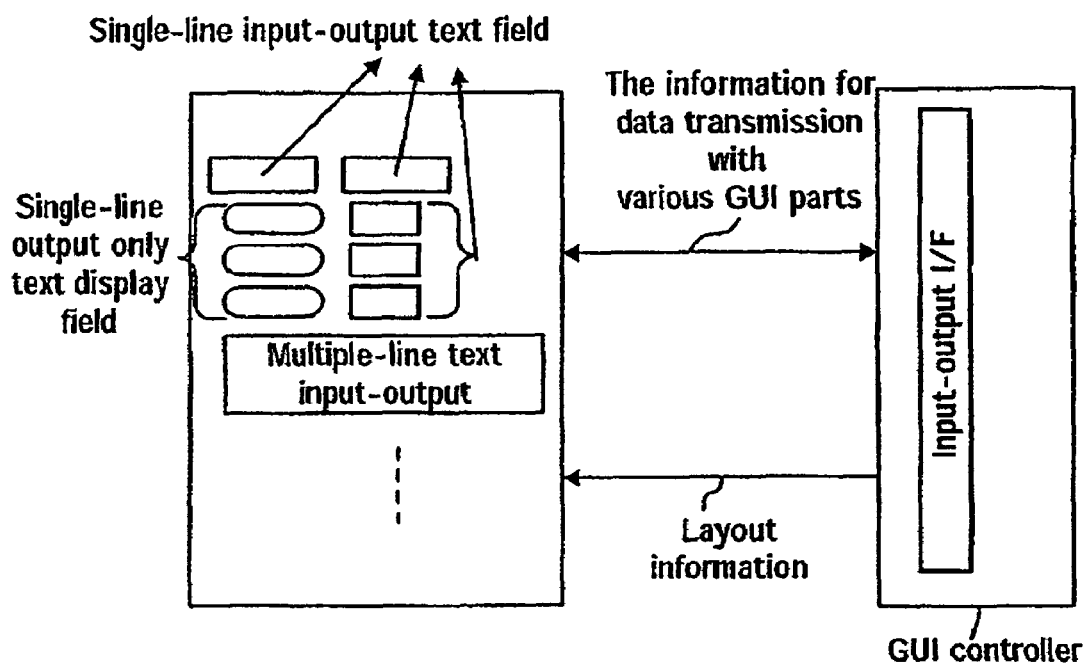
FIG. 16 This is the drawing to explain that the GUI controller controls the operation of each part.
Figure 17:
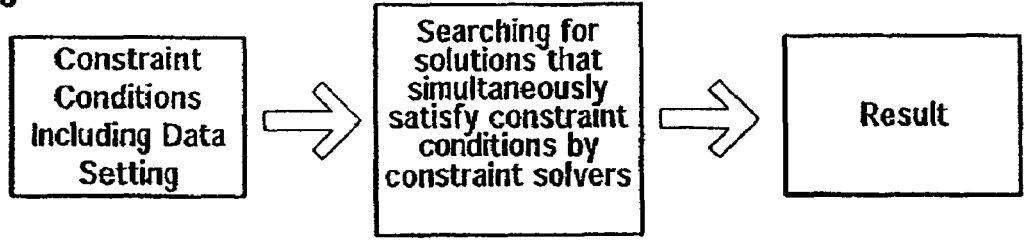
FIG. 17 This is the drawing that shows the solution order in the conventional declarative programming method.

FIG. 15 is the conceptual drawing to show the configuration on the client side of the client/server system that realizes the window system. As for the system configuration on the server side, because it is similar to what is shown in FIGS. 1, 3, 8 and 10, it is omitted. As shown in FIG. 15, the GUI client has the GUI processor and GUI controller, and the GUI controller controls the operation of each part shown in FIG. 16. The content of the GUI controller here has the similar configuration with FIGS. 1, 3, 8 and 10, and the modification of the conditions of each part is executed for the I/F controller for the input-output I/F in FIGS. 1, 3, 8 and 10 inside the client. As constraint conditions, cooperation rules among each part, consistency checking of input data to be processed by clients, input supports, conversion rules for data to be passed to the server side and such are described and processed. The data converted and processed at the GUI controller are transmitted to the server through variables for transmittance. Of course, it goes without saying that system configuration can be flexibly transformed and used, processing the GUI processing part of the client and the constraint processors of the server in a mass with only one machine and such. By the way, as for the sequential solution function of constraint conditions according to the value modification of variables, which is the characteristics of the present invention, the client/server system as a whole has it, and the aforementioned GUI controller has it. Also, data transfer between the client the server may be in unique form, but it is possible to realize open protocol that is compatible with the conventional method through using such standardized data formats as XML.

As just described, on the GUI side, the GUI operation control, consistency confirmation of transmitted data, input supporting, GUI condition modification in accordance with data conditions, and notification processes to the server side and such can be executed based on the description of constraint conditions.

Then, the window operation is explained in detail. The construction inside each window is possible by aforementioned constraint condition setting that permits dealing with each data structure, the UNDO function, or the user interface that can realize the transaction processes of databases, the operation of this window itself is described as follows.

As information on the window, for example, the following structure is defined.

```
struct {
    position x, y ;
    size x, y;
    current_display_flag ;
} window_information [ ] ;
```

By the way, the following express as follows.
window_information[0] . . . Application 1
window_information[1] . . . Application 2
window_information[2] . . . Application 3

Reference updating of these variable values is dealt with in the similar way as the system resources in FIG. 10, and it is interlocked with the actual windows of the GUI system.

An example of the cases where window operations (display/non-display, movement, size change), which are displayed on the screen to execute applications, are described with constraint conditions is shown as follows.

(a) Display/Non-display of the Window n
  Opening a window on the screen (display) . . . window_information[n]. current_display_flag=true,
  Closing a window on the screen (non-display) . . . window_information[n]. current_display_flag=false, Also, when there is a [close button] to close the window on the screen, for example, it can be window_information[n]. current_display_flag=!<the condition of the close button>(! is a not operator).

(b) Movement of the Window n
  window_information[n]. position. x=<the size of x to move>;
  window_information[n]. position. y=<the size of y to move>;

(c) Size Change of the Window n
  window_information[n]. size. x=<the size of x to change>;
  window_information[n]. size. y=<the size of y to change>;

Other than the above, to make Application 2 situated on the right to Application 1, the following are acceptable.
  window_information[1]. position. x=window_information[0]. position. x+window_information[0]. size. x;
  window_information[1]. position. y=window_information[0]. position. y;

Also, to fix the size of the window size, window_information [n]. size. x and window_information[n]. size. y are set unchangeable, after preparing the attributes of changeable/unchangeable as variables.

As just described, as for the window systems and the multi-window systems in the GUI environment, in the conventional programming method, if events take place, the operations of windows and application operations inside the windows that are in response with those events have had to be described one by one, while according to the operation control of the present invention, based on the open-and-shut constraint conditions, the complicated behaviors of applications can be simply and easily described.

By the way, though the fact that the operations on window systems can be controlled with the description of constraint conditions was mentioned in the GUI environment, needless to say, skilled persons in the technical field of the present invention could easily imagine that the present invention can be applied not only when data are output on the screen, but also when the output system (for example, the form printing system), which outputs the contents that are processed with the window into any medium (for example, paper), is realized. Also, in the aforementioned explanation, specific examples on the client/server system are shown, but it is not necessary to be a client/server system, and it is acceptable to construct the client and the server as separate systems, and to enable aforementioned processes only for the client or for the server.

Other Application Examples of the Present Invention: Parallel Processing and Constructed Computer Systems Also, the present invention can be applied to the problems of parallel processing, which are troublesome problems in procedural programming. As for parallel processing, it is thought that it is broadly classified into two kinds of operations. That is, the method that some CPUs execute algorithms from the step S23 to the step S30, and the method that variables and relational expressions are constructed in the architecture like data flow machines. In the former case, if parallel processing is tried with the normal procedural programming method, at the stage of constructing algorithms, the user must describe divided programming procedures, being conscious of the parallel operations of the CPU. On the other hand, in the case of parallel processing of the present invention, just operating the processes from the step S23 to the step S30 started from variable modification at the step S22 in the algorithm in FIG. 22 in parallel, the user can realize parallel processing without being conscious of parallel processing directly.

Specifically, as for the Constraint-based Solvers of the aforementioned embodiments from the first to the fourth, a series of operations due to modification of variable values at the step S22 with regard to other processes are executed while the steps from S23 to S30 are being executed for certain processes. In actuality, though it is necessary to realize exclusive control and synchronous control among each variable during the execution of this parallel processing, as is the case with mounting parallel algorithms for conventional procedural programming method, the method of the conventional procedural programming can be applied as it is.

If relational expressions are constructed with variables in the latter architecture, relational expressions among variables become channels, for example, when realizing them on parallel computers physically. On these parallel computers, parallel processors are bound by complicated channels, and communication costs vary depending on the routes. Expressing these communication costs with priority orders enables automatic selection of data routes. As for the priority orders, (Constraint Conditions with Priority Orders), which has been cited as an example of constraint conditions, can be used. In the similar way with such parallel processing, in general, the present invention can be applied to the entire constructed systems. By the way, the systems here are computers and machines for exclusive use in accordance with application, which have different multiple qualities, and the compounds that are consisted of the network binding them, thus indicating general corporate systems and social systems.

That is, when the present invention is applied to the entire system, conceptually, it resembles the realization method of parallel processing with aforementioned data flow machines, and the computers that are configured with the present invention are connected with the variables that are the interfaces of other computers through the variables that become the interfaces among the computers. Relational expressions among variables are channels, and communication costs are priorities, so the aforementioned entire system can be designed and constructed by the present invention.

Other Application Examples of the Present Invention: Fusion with the Existing Programming Language As explained so far, the present invention deals with event-driven calculation execution principles that the problems consisted of any constraint condition are solved with constraint propagation through modifying the variable values taking the opportunities of the directions (events) from outside (the user and such). As mentioned above, as is obvious from the fact that existing procedural programming language is used for Function Definition Holding and Function Definition Execution, it is assumed that it can be combined with the existing programming language, though it is shown in FIG. 18. Consequently, the fact that the present invention can be fused to the existing programming language is described further in detail.

By the way, when programming languages are classified, broadly, one of them has been classified as procedural programming, and the other declarative programming so far, but actually more meticulous classification of programming languages exists. That is, in the non-declarative programming language against the declarative programming language, the functional programming language as a programming language, which is equivalent to the procedural programming language, is included. Hereinafter, the fusion of the present invention and the functional programming language is dealt with.

(A) Fusion with the Functional Programming Language

Here, the natural fusion method with the LISP language (Common LISP), which has the longest history and can be said to be the representative as the functional programming language, is mentioned. Now, assuming that the initial values of the two variables a and b, and the following constraint conditions are defined.

$a=\{11, 12, 13\}$ $b=\{1, 2, 3\}$ $a[\$i]=b[\$i]+10$

Both of the values of a and b are the arrays that have three elements. Also, if the function defconstraint, which defines the constraint in the embodiments of the present invention, is newly defined, and if assignment to variables is made to respond to binding to symbols, it can be probably described as follows.

(set 'a #(11 12 13))

(set 'b #(1 2 3))

(defconstraint '(=(aref a $i) (+(aref b $i) 10))   (Formula 18)

Here, the function defconstraint creates solution formulas with regard to the symbols (variables) a and b from arguments to realize the data structure in FIG. 9, and execute the following:

(defconstraint2'(=(aref a $i) (+(aref b $i) 10))

'(setf(aref a $i) (+(aref b $i) 10))

'(setf(aref b $i) (−(aref a $i) 10)))

And the function defconstraint2 maintains the data structure in FIG. 9. Though the data structure in FIG. 6 and such is acceptable as the data structure of formulas, as for LISP, the structure can be described only with the functions of LISP itself, so here the characteristics of this LISP is taken advantage of, and the formulas like above are described.

Though the similar things can be said about the pointers and such of the C language, as for the LISP language, there is possibility that each datum is shared, and the relationship between variables and data is not necessarily one for one. As a result, when certain data are modified, normally, whether they are related to particular symbols is not known when values are assigned to variables. Therefore, because the relational structure between such variables and data becomes a problem in realizing the constraint solution of the present invention, this is explained.

Figure 22:
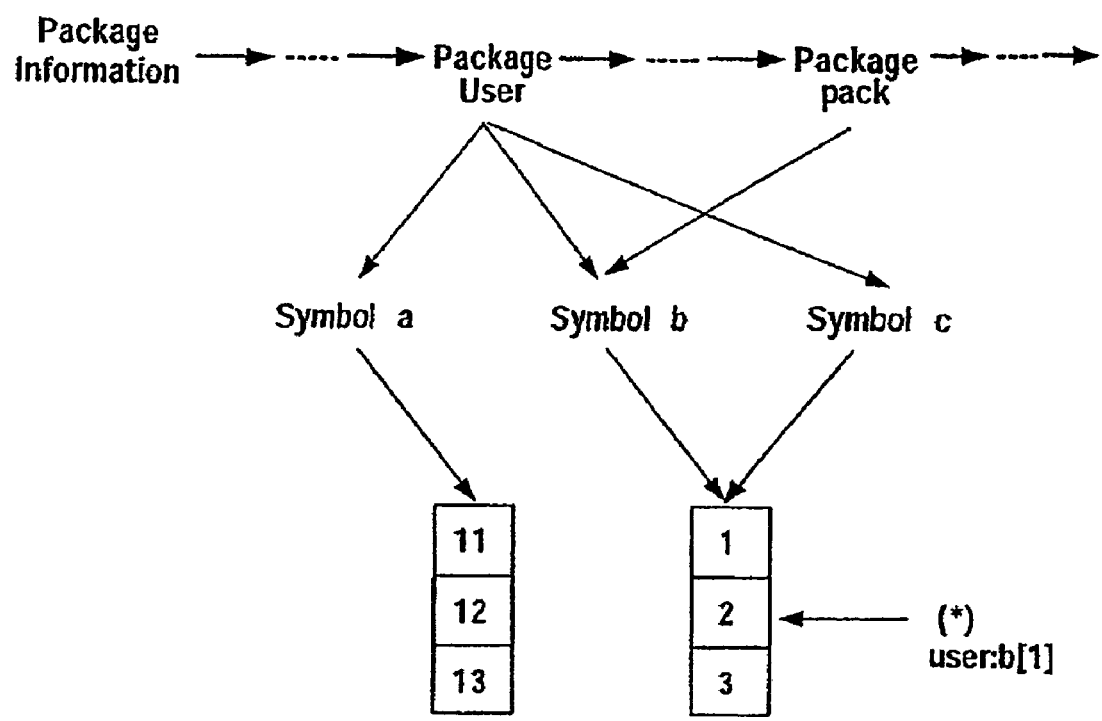
FIG. 22 This is the example of the drawing that shows one example that the internal data structure of the normal LISP language is highly simplified.

Now, adding the symbol c indicating the same datum as the symbol b, an example that the internal data structure of the normal LISP language, which centers on the symbols a, b and c, is highly simplified, is shown in FIG. 22. In the LISP language, all symbols are recorded in packages, and they are saved in separate name spaces, so it is described from packages here. Also, because the standard name of a name space is 'user', the symbols a, b and c are registered to 'user', but in this example the symbol b is also registered to another package.

When b[1]=12 is executed with the LISP language,
(setf(aref b 1) 12)

is executed, but the function setf, which executes the assignment of values, is required to execute matching with constraints that are defined with the aforementioned function defconstraint2. On the other hand, data to be passed to the function setf are the pointers that are shown with (*) in FIG. 22 in normal LISP, and no information to execute matching exists. Consequently, in case of such simple examples, when functions are evaluated, the method to carry about the information of not only the evaluation result but also that of the evaluated formulas until the execution of the function setf can be considered. However, in fact, response becomes difficult in cases where the data kept become huge because they turn out to be very complicated formulas and b[1] in (setf(aref c 1) 12) is modified.

Figure 23:
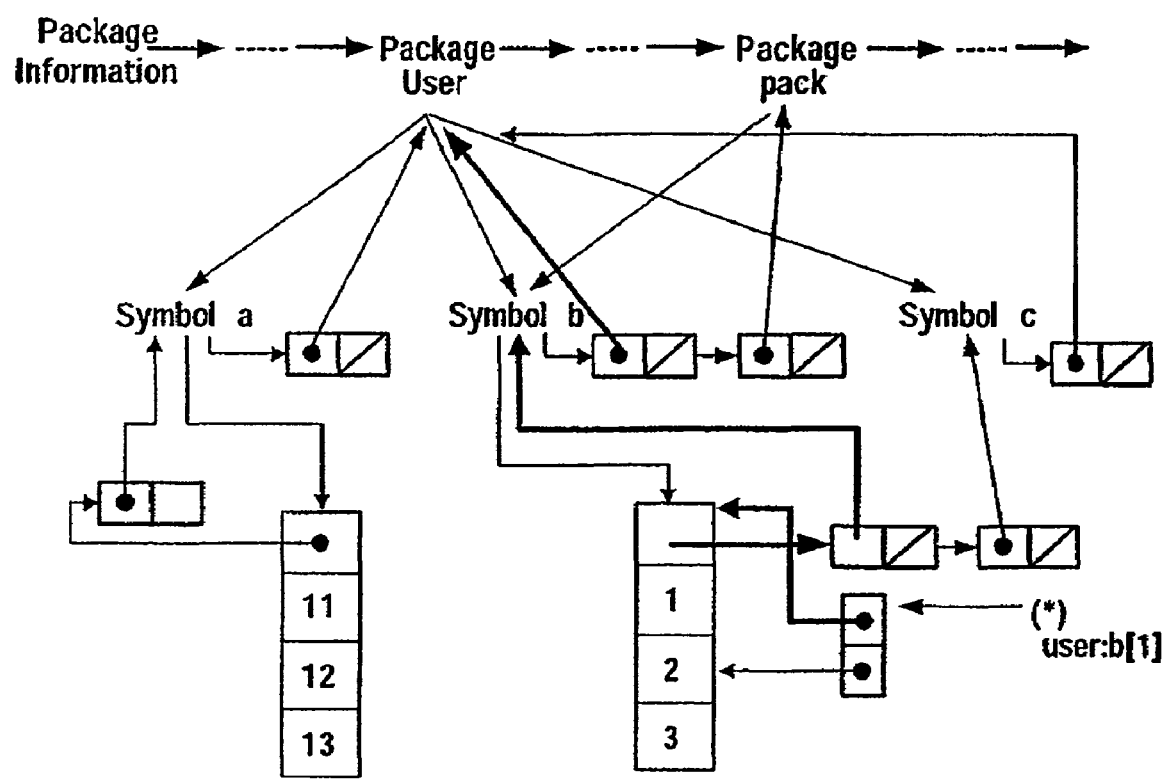
FIG. 23 This is the drawing that shows one example that the basic structure of the LISP language can be tracked back bi-directionally.

To solve this, every basic data structure of the LISP language can be configured so that it can be tracked back bi-directionally. If the data structure is shown in a drawing as an example, it becomes like FIG. 23. The array reference by the function aref, which is shown with (*) in FIG. 23, holds not only the pointers inside the arrays, but also the information of arrays themselves, so that it can track back backward. All data that include array information save each kind of information, so that the information of bound symbols can be traced.

Also, in fact, not only symbols but also registered package information have to be tracked back, and therefore, as for the symbols of constraints, it is necessary to consider packages. The routes in tracking back b[1] from (*), (user:b[1] including packages) are shown with bold arrows in FIG. 23.

By the way, the symbols of Common LISP have the information of home packages, but there are some cases where one symbol is saved in multiple packages As a result, it becomes necessary to add a new data structure, with which all packages that are registered are traced, but in this way, it becomes possible to check matching of constraints when setf is executed. As explained above, it is possible to deal with the present invention, completely fusing it with the functional programming language, which is representative as the LISP language.

(B) Problems and Solution Methods of the Method (A)

By the fusion with the functional programming language in aforementioned (A), it becomes possible to apply the present invention on the LISP language, and it becomes idealistic as the mounting on the functional programming language, but because matching of constraints is necessary every time assignment operation, for example, setf and such, is executed, execution efficiency gets worse in principle. Especially, on the occasion of matching with constraints backward in assigning (backward matching), whether relevant constraint definition exists or not cannot be known without tracking back considerably upward. Foe example, only index information, such as [1], can be known at the point of pointers, but even the simple constraints have such structures as a[x] and b[x], so it is only at the time of limited special conditions that whether any constraint conditions to be matched exist or not can be judged from only index information.

On the other hand, in the case of matching tracked back from symbol names (variable names), in many cases, whether constraint conditions exist or not is known from the beginning, and it is possible to speed up the processes by adding such information to variables (symbols) themselves. Also, as for actual constraints, simple examples such as a[x] rarely appear, and matching with reverse direction always has to track back, probably completely, considerably complicated formulas fairly upward. When it is thought that this is mounted in the complicated package mechanism of actual Common LISP, mounting becomes very complicated, and though it is considered that more or less improvement can be expected by various methods as for execution time, compared to matching of constraints starting from variables, execution efficiency obviously becomes unrealistically bad.

Consequently, as a realistic solution method, in cases where complete fusion is given up and constraint conditions are used, if formula-processing mechanism for exclusive use is prepared and limitation that values can always be referred to only from variables (symbols) inside it is added, aforementioned problems can be prevented. For example, as letter string data are expressed being enclosed within double quotations, if formula data are abstracted as one of data types and expressed being enclosed within question marks for example, the function peval is defined to execute formula processing mechanism for exclusive us, and assignment formulas are executed in the function peval, the aforementioned formula (18) can be described as follows.

(peval '?a={11, 12, 13}?)

(peval '?b={1, 2, 3}?)

(defconstraint '?a[$i]=b[$i]+10?)

And in cases where b[1]=12 is executed, it is acceptable to execute (peval '?b[1]=12?)

In such cases, because it is decided that only reference from variables (symbols) can always be executed in formula processing, matching to opposite direction is unnecessary, so mounting problems, which are described in aforementioned (A), do not occur on the LISP language, and moreover, the other functions of the LISP language are never influenced, thus solving the problems of execution efficiency.

However, needless to say, it is very unnatural as a programming language. Consequently, it is acceptable to newly define the grammar of the programming languages, and prepare parsers (syntax analysis tools) so that formula processing mechanism can be naturally used when assignment controls and such are executed. This is different from the original LISP language because the grammar is parsed in inputting and is replaced by internal expression that is LISP, but it becomes possible to realize the programming language, which has ability not to eminently decrease execution efficiency as a result of combining the advantages of the LISP language and this method.

By the way, here, the basic elements of the programming languages that have the most major C-language type grammars, in which formula evaluation is always executed in the function peval basically, are shown, and thus the method to make the function peval used naturally is described. As can be understood if it is seen after conversion, though it has the C-language type grammars and can be described in the similar way as the C-language, it is LISP essentially, and there is an advantage in that it has flexible description ability. Moreover, it is possible to execute it while the pure LISP programming is completely mixed.

The interpreting execution of formulas including functions that can be said to be the basic units of the present system is translated as follows. By the way, as for the type declaration, it is omitted because it is essentially irrelevant.

```
Input:
    a[1] = func1(100);
Execution Function:
    (peval '?a[1]=func1(100)?)
```

The block structures with local variables that are basic structures of the C-language are interpreted as follows.

```
Input:
    {
        int x, y;
        x = 10;
        y = 20;
    }
Execution Function:
    (let (x y)
        (peval '?x=10?)
        (peval '?y=10?))
```

The functions that include the rough basic elements of the C-language and have local variables and loop structures are interpreted as follows.

```
Input:
    int f( int v )
    {
        int i, n = v;
        for (i = 0; i < 10; i++)
            n++;
        return n;
    }
Execution Function:
    (defun f (v)
        (let (i, n)
            (peval '?n=v?)
            (prog ()
                (peval '?i=0?)
                loop
                (if (not (peval '?i<10?))
                    (return nil))
                (peval '?n++?)
                (peval '?i++?)
                (go loop)
                (return-from f n)))
```

Formula interpretations and execution methods can be thought variously, and these conversion methods are just partial examples, but as for conversion methods, please note that various compiling techniques that are already established can be adapted. As just described, it is possible to design the extremely strong programming language, which naturally replaces the formula execution related with the constraints with the function peval to execute it and combines the characteristics of the present invention and LISP. Using this, as a result of describing FIGS. 12(*a*) and (*b*) with the powerful programming language, which is fused with the functional language, it becomes possible to execute it without dropping actual execution efficiency, while the Constraint-based Solvers shown in FIG. 3, FIG. 8 and FIG. 10 of the present invention are collecting all the functions of the existing procedural and functional programming. In this occasion, the operators shown in FIG. 21 are realized in formula processing inside the function peval.

Other Application Examples of the Present Invention: Combination with Designing Methods Also, the present invention can be applied in combination with designing methods. Though there are many kinds of development designing methods, whatever methods they are, there is a common concept that requirement wanted to be realized is analyzed first of all, then, the target specification that is developed to realize the requirement is determined, and the programs that satisfy the specification is developed. However, in case of the conventional procedural programming method, the behavior of the CPU had to be described as program codes in the end, whatever development method it may have. On the other hand, the declarative programming method hides the possibility to solve this problem, but it is a big problem that the execution efficiency of the computers is not good, as is described in the beginning. Accordingly, when it comes to the current general programming task, it often indicates the procedural programming method.

By the way, as one of the system designing methods, there is data-oriented one. The data-oriented method is known as the method in which business systems can be designed well, but even though system designing is executed to realize requirements in this method, in the end, coding task is required, and the behaviors of the CPU have to be described as programming codes. As for the description of the behaviors of the CPU, today, even though software engineering is developed, essentially, it relies on the experience and hunch of programmers, and, in the present circumstances, development-designing task that exists in the domains of human creative task is tough. As a tool to decrease development-designing tasks, there are CASE tool and such. However, though these could decrease development tasks, as for the essential problem of making it unnecessary for humans to describe the behaviors of the CPU, it had not been solved yet.

Consequently, though the solution of the aforementioned essential problems is neglected, in the conventional methods, instead, it is emphasized to reuse program codes, For example, the creation of libraries for software and the object-oriented programming languages have been conceptualized and produced with the purpose of reusing this.

On the other hand, as for the present invention, though it is required to consider the behaviors of the computers, the complicated behaviors as were conventional need not be considered at all. That is, programmers are released from the task to describe the behaviors of the CPU directly, which is the common problem with each kind of designing methods, and there is no need of doing creative tasks in coding. Therefore, according to the present invention, it becomes possible to generate programming codes automatically from specifications as the advanced forms of the CASE tool, tools that resemble the CASE tools, and the other tools, and automatic programming can be realized.

If the entire systems, not single computers, are designed and developed by the present invention, it is also possible to generate entire vast systems automatically. In this case, a great many variables and relational expressions are used, but needless to say, in the same way as the conventional designing methods, top-down designing methods and bottom-up designing methods can be realized, and moreover, dividing domains with functions and reusing divided domains are possible. Also, needless to say, the present invention can be applied to any development designing method in common.

Other Application Examples of the Present Invention: Application to Graphic Data and Robots As the further application examples of the present invention, applications to the models of computer graphics and moving parts of robots such as joints are explained. Here, complicated problems that are not directly related with the present invention, such as accuracy of robot controlling, are omitted, and the treatment of joints that are connected is only explained. Now, assuming that there are four joints A, B, C and D between connected dots a and e, and that the position between the joint A and B is b, B and C is c, and C and D is d, the relationships among the dots from a to e can be expressed with these five dots. In case where each dot is three-dimensional, which are expressed with vectors with three coordinates (x, y, z), the rotational behaviors of each joint are shown with the rotation matrix of 3*3. By the way, it is acceptable to add the parallel movement component further to this rotation matrix and have the matrix of 4*4.

To simplify the present problem, if only the rotation, omitting the length between each dot, is expressed with constraints, they are as follows.

$$b=a*A \quad (a)$$

$$c=b*B \quad (b)$$

$$d=c*C \quad (c)$$

$$e=d*D \quad (d)$$

Here, A, B, C and D show the rotation matrixes of the corresponding joints.

Normally, because there is limitation of movement range of the joints, there is also limitation of the values for each rotation matrix from A to B, so the user is supposed to describe this limitation with constraints. If a is fixed and the joint B is changed, it is necessary that the aforementioned order of constraint propagation, (b)→(c)→(d) is executed. Also, if there is the position e that is wanted to be moved against fixed a, by this constraint propagation, only necessary rotation components of each rotation matrix D, C, B and A is corrected and automatically fixed. The fact that a is fixed can be realized by adding variables showing that it is fixed as a constraint condition, or by making the system variables and relational expressions hold it as an attribute. Consequently, if each rotation matrix from A to B is assumed to be the angles of motors and such that control each joint, this can be applied to robot controlling. Also, if three-dimensional coordinates from a to e receive perspective transformation and they are plotted on display devices and such, they exist completely in the same way as the cases where they are applied to computer graphics.

If the present invention is applied to these kinds of moving parts of robot joints and such, realistically they become more complicated, but still, it can be much more simply and naturally realized than realizing them in the procedural programming method. By the way, the application example for the moving parts of robot joints is only one of examples, and needless to say, any problem that resembles joints can be solved well.

Other Application Examples of the Present Invention: Application to Chemistry Fields, Physics Field and Simulation Fields Also, as the further application example of the present invention, application for Chemistry fields is explained. When Chemistry is dealt with, various modeling ways can be considered, but here, they are simplified for explanation, and only the contents that are directly related to the present invention are explained.

To deal with each element in chemical formulas as objects, it is defined as a class by element type, and elements expected to be used are instantiated as appropriate. Each element object is made to have join conditions with other elements and element qualities as constraint conditions. Also, the combinations of elements are managed with chemical compound objects, and they are expressed registering element objects to chemical compound objects. In chemical compound objects, the qualities in cases where they are combined and combination conditions are held as constraint conditions. Configuring like this enables the user to modify the combinations of objects freely, but on the other hand, impossible combinations can be prohibited by constraint conditions, and the fact that the qualities of chemical compounds are updated can be known accordingly when the modification of the elements is successful. Also, in such occasions, for example, the conditions of electron are held as variables (attributes) in the element objects, constraint propagation related to electron variables takes place, and the behaviors of electron as physical phenomena can be expressed.

As just described, the present invention can express chemical phenomena, physical ones and such efficiently, but this is the simulation of modeling certain situations and phenomenon occurrence, and constraint solution itself to variable modification is a particular phenomenon. By the way, needless to say, this method can be used for many simulation fields, without limiting them to chemical phenomena, physical ones and such.

Other Application Examples of the Present Invention: Application to Linear Programming (The Simplex Method and Such)

Also, judging from the explanation so far, it would be obvious for skilled persons that the present invention can be applied in cases where the user can input constraint conditions of which the procedures for constraint propagation with regard to target problems are considered as for the constraint conditions described on linear programming such as the simplex method, integer programming and transportation problems typically.

Other Application Examples of the Present Invention: Application to the Neural Network The neuron models on the neural network can be described with constraints that have threshold values as variables. Seen from this point of view, the bonds of neuron models on the neural network are special types of constraint relationship that are dealt with in this method, and can be regarded as subsets. According to the neural network, deciding the threshold values of each neuron model in the network to gain desired results is called learning, but in this learning it has been a subject how the threshold values to gain desired results are set. And as for the learning method, it has been conceptually close to conventional constraint programming for this method. However, setting the threshold values of neuron models is the variable value setting task, and it can be regarded as programming by the method described in the present invention. Therefore, the present invention can be applied to the neural network. That is, by the present invention, not only automatically adjusting values, but also the leaning method by setting partial or all of the threshold values considering behaviors can be realized.

By the way, because the aforementioned contents are only partial examples to explain the technical ideas of the present invention, and they are not limited to them, so it is obvious that there is no difference in the constancy of fundamental technical ideas, even though those who have normal knowledge in the technical field of the present invention add or modify each configuration of Constraint-based Solvers and the definition methods of constraint conditions when the technical ideas of the present invention are realized.

Also, needless to say, the purpose of the present invention can be attained through supplying storage media that store the programming codes of software that realize the functions of the Constraint-based Solvers 100, 200, 300 and 400 in the aforementioned embodiments with systems or devices and the computers of those systems or devices (or CPUs and MPUs) loading to execute the programming codes that are stored in storage media.

In this case, programming codes themselves, which are loaded from storage media, realize the functions of these embodiments, and the storage media and the relevant programming codes turn out to configure the present invention. As storage media to supply programming codes, ROM, flexible disks, hard disks, optical disks, magnetic optical disks, CD-ROMs, CD-Rs, magnetic tapes, nonvolatile memory cards and such can be used.

Also, needless to say, there included not only the cases where the above-mentioned functions of these embodiments are realized through executing programming codes that the computers load, but also the cases where the functions of these embodiments are realized by the processes that the OS and such, which is operating on the computer, executes partial or all of the actual processes based on the directions of such programming codes.

What is claimed is:

1. A computer system configured to receive user input, the computer system comprising:
    a constraint condition inputting module configured to receive a set of constraints and to store the set of constraints in a memory;
    a variable value setting module configured to receive a set of variable values referenced by one or more of the constraints in the set of constraints and to store the set of variable values in a memory;
    a constraint condition extraction module configured to extract one or more of the constraints in the set of constraints which reference variables whose values have been modified;
    a constraint condition calculation module configured to solve the extracted one or more of the constraints using one or more variables values that have been modified and based on a predetermined order;
    a variable value resetting module configured to identify variable values that have been modified by the constraint condition calculation module and to electronically communicate to the variable value setting module which variable values have been modified;
    the constraint condition extraction module further configured to continue extracting one or more of the constraints while there is at least one variable value that has been modified; and
    wherein the variable value resetting module processes in serial.

2. A computer system configured to receive user input, the computer system comprising:
    a constraint condition inputting module configured to receive a set of constraints and to store the set of constraints in a memory;
    a variable value setting module configured to receive a set of variable values referenced by one or more of the constraints in the set of constraints and to store the set of variable values in a memory;
    a constraint condition extraction module configured to extract one or more of the constraints in the set of constraints which reference variables whose values have been modified;
    a constraint condition calculation module configured to solve the extracted one or more of the constraints using one or more variables values that have been modified and based on a predetermined order;
    a variable value resetting module configured to identify variable values that have been modified by the constraint condition calculation module and to electronically communicate to the variable value setting module which variable values have been modified;
    the constraint condition extraction module further configured to continue extracting one or more of the constraints while there is at least one variable value that has been modified; and
    wherein the constraint condition calculation module processes in parallel.

3. A computer system configured to receive user input, the computer system comprising:
    a constraint condition inputting module configured to receive a set of constraints and to store the set of constraints in a memory;
    a variable value setting module configured to receive a set of variable values referenced by one or more of the constraints in the set of constraints and to store the set of variable values in a memory;

a constraint condition extraction module configured to extract one or more of the constraints in the set of constraints which reference variables whose values have been modified;

a constraint condition calculation module configured to solve the extracted one or more of the constraints using one or more variables values that have been modified and based on a predetermined order;

a variable value resetting module configured to identify variable values that have been modified by the constraint condition calculation module and to electronically communicate to the variable value setting module which variable values have been modified;

the constraint condition extraction module further configured to continue extracting one or more of the constraints while there is at least one variable value that has been modified; and wherein the constraint condition calculation module processes in serial.

4. A computer system configured to receive user input, the computer system comprising:

a constraint condition inputting module configured to receive a set of constraints and to store the set of constraints in a memory;

a variable value setting module configured to receive a set of variable values referenced by one or more of the constraints in the set of constraints and to store the set of variable values in a memory;

a constraint condition extraction module configured to extract one or more of the constraints in the set of constraints which reference variables whose values have been modified;

a constraint condition calculation module configured to solve the extracted one or more of the constraints using one or more variables values that have been modified and based on a predetermined order;

a variable value resetting module configured to identify variable values that have been modified by the constraint condition calculation module and to electronically communicate to the variable value setting module which variable values have been modified;

the constraint condition extraction module further configured to continue extracting one or more of the constraints while there is at least one variable value that has been modified; and wherein at least one of the constraint condition extraction module, the constraint condition calculation module, and the variable value resetting module processes in parallel.

5. A computer system configured to receive user input, the computer system comprising:

a constraint condition inputting module configured to receive a set of constraints and to store the set of constraints in a memory;

a variable value setting module configured to receive a set of variable values referenced by one or more of the constraints in the set of constraints and to store the set of variable values in a memory;

a constraint condition extraction module configured to extract one or more of the constraints in the set of constraints which reference variables whose values have been modified;

a constraint condition calculation module configured to solve the extracted one or more of the constraints using one or more variables values that have been modified and based on a predetermined order;

a variable value resetting module configured to identify variable values that have been modified by the constraint condition calculation module and to electronically communicate to the variable value setting module which variable values have been modified;

the constraint condition extraction module further configured to continue extracting one or more of the constraints while there is at least one variable value that has been modified; and wherein at least one of the constraint condition extraction module, the constraint condition calculation module, and the variable value resetting module processes in serial.

* * * * *

UNITED STATES PATENT AND TRADEMARK OFFICE
CERTIFICATE OF CORRECTION

PATENT NO. : 7,499,764 B2  Page 1 of 1
APPLICATION NO. : 11/447765
DATED : March 3, 2009
INVENTOR(S) : Toshio Fukui It is certified that error appears in the above-identified patent and that said Letters Patent is hereby corrected as shown below:

On page 1 at item 56, column 2, line 10, under Other Publications, please change "Acommodation"" to --Accommodation"--.

In FIG. 2 (Sheet 2 of 20) at Reference Numeral S20, please change "Are.initial" to --Are initial--.

At column 1, line 49, after "2)" please insert --.--.

At column 5, lines 43-44, after "constraints" please insert --.--.

At column 12, line 43, please change "anew" to --a new--.

At column 13, line 21, please change "2operation" to --2 operation--.

At column 27, line 2, after "12?)" please insert --.--.

Signed and Sealed this

Sixteenth Day of February, 2010

David J. Kappos
*Director of the United States Patent and Trademark Office*